US009695066B2

(12) United States Patent
MacCallum et al.

(10) Patent No.: US 9,695,066 B2
(45) Date of Patent: *Jul. 4, 2017

(54) IONOMER-MEMBRANE WATER PROCESSING APPARATUS

(71) Applicant: Paragon Space Development Corporation, Tucson, AZ (US)

(72) Inventors: Taber K. MacCallum, Tucson, AZ (US); Laura Katrina Kelsey, Tucson, AZ (US)

(73) Assignee: Paragon Space Development Corporation, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/343,150

(22) Filed: Nov. 3, 2016

(65) Prior Publication Data

US 2017/0073250 A1 Mar. 16, 2017

Related U.S. Application Data

(63) Continuation-in-part of application No. 15/194,391, filed on Jun. 27, 2016, now Pat. No. 9,511,327, which
(Continued)

(51) Int. Cl.
*B01D 61/36* (2006.01)
*B01D 71/36* (2006.01)
(Continued)

(52) U.S. Cl.
CPC ............ *C02F 1/448* (2013.01); *B01D 61/362* (2013.01); *B01D 61/364* (2013.01);
(Continued)

(58) Field of Classification Search
None
See application file for complete search history.

(56) References Cited

U.S. PATENT DOCUMENTS 3,415,719 A * 12/1968 Telkes .................. B01D 5/0066
159/904
3,547,271 A * 12/1970 Edwards .............. B01D 63/082
210/321.72
(Continued)

FOREIGN PATENT DOCUMENTS

AU 2012 233 249 10/2013
WO 00/22684 4/2000

OTHER PUBLICATIONS

Paragon NPL IWP development.pdf—Kelsey et al—Jul. 2014.*
(Continued)

*Primary Examiner* — Krishnan S Menon
*Assistant Examiner* — Bradley R Spies
(74) *Attorney, Agent, or Firm* — Weaver Austin Villeneuve & Sampson LLP

(57) ABSTRACT

This disclosure provides water processing apparatuses, systems, and methods for recovering water from wastewater such as urine. The water processing apparatuses, systems, and methods can utilize membrane technology for extracting purified water in a single step. A containment unit can include an ionomer membrane, such as Nafion®, over a hydrophobic microporous membrane, such as polytetrafluoroethylene (PTFE). The containment unit can be filled with wastewater, and the hydrophobic microporous membrane can be impermeable to liquids and solids of the wastewater but permeable to gases and vapors of the wastewater, and the ionomer membrane can be permeable to water vapor but impermeable to one or more contaminants of the gases and vapors. The containment unit can be exposed to a dry purge gas to maintain a water vapor partial pressure differential to drive permeation of the water vapor, and the water vapor can be collected and processed into potable water.

10 Claims, 14 Drawing Sheets

Related U.S. Application Data is a continuation of application No. 14/609,735, filed on Jan. 30, 2015, now Pat. No. 9,399,195.

(60) Provisional application No. 61/934,382, filed on Jan. 31, 2014.

(51) Int. Cl.

| | | |
|---|---|---|
| *B01D 63/08* | (2006.01) | |
| *C02F 1/44* | (2006.01) | |
| *B01D 69/12* | (2006.01) | |
| *B01D 63/10* | (2006.01) | |
| *B01D 71/32* | (2006.01) | |
| *C02F 103/00* | (2006.01) | |
| *C02F 103/08* | (2006.01) | |
| *C02F 101/16* | (2006.01) | |

(52) U.S. Cl.
CPC ......... *B01D 61/366* (2013.01); *B01D 63/082* (2013.01); *B01D 63/10* (2013.01); *B01D 69/12* (2013.01); *B01D 71/32* (2013.01); *B01D 71/36* (2013.01); *C02F 1/447* (2013.01); *B01D 2311/13* (2013.01); *C02F 2101/16* (2013.01); *C02F 2103/002* (2013.01); *C02F 2103/005* (2013.01); *C02F 2103/08* (2013.01); *C02F 2201/001* (2013.01)

(56) References Cited

U.S. PATENT DOCUMENTS

| | | | | |
|---|---|---|---|---|
| 3,612,282 | A * | 10/1971 | Cheng | B01D 61/08 |
| | | | | 210/321.89 |
| 4,568,441 | A * | 2/1986 | Covitch | C25B 9/10 |
| | | | | 156/242 |
| 5,547,551 | A | 8/1996 | Bahar et al. | |
| 7,510,752 | B1 * | 3/2009 | Robertson | E04D 5/10 |
| | | | | 428/40.1 |
| 2005/0164025 | A1 * | 7/2005 | Simonetti | B01D 61/145 |
| | | | | 428/532 |
| 2006/0081455 | A1 * | 4/2006 | Yonover | C02F 1/043 |
| | | | | 202/152 |
| 2008/0182149 | A1 * | 7/2008 | Zhang | H01M 8/04141 |
| | | | | 429/414 |
| 2009/0181276 | A1 | 7/2009 | Beutel | |
| 2009/0266048 | A1 | 10/2009 | Schwarz | |
| 2010/0028635 | A1 * | 2/2010 | Bansal | B01D 39/1692 |
| | | | | 428/213 |
| 2010/0096317 | A1 | 4/2010 | Morita | |
| 2012/0255897 | A1 | 10/2012 | Lu et al. | |
| 2015/0217232 | A1 * | 8/2015 | MacCallum | C02F 1/447 |
| | | | | 210/321.64 |

OTHER PUBLICATIONS

Kelsey, et al., "*Contaminant Robust Water Extraction from Lunar and Martian Soil for In Situ Resource Utilization—System Architecture Development*," $42^{nd}$ International Conference on Environmental Systems, Jul. 15-19, 2012, San Diego, CA, 14 pages.

Kelsey, et al., "*Contaminant Robust Water Extraction from Lunar and Martian Soil for In Situ Resource Utilization—System Testing*," American Institute of Aeronautics and Astronautics, 15 pages.

Kelsey, et al., "*Development of Ionomer-membrane Water Processor (IWP) technology for water recovery from urine*," $44^{th}$ International Conference on Environmental Systems, Jul. 13-17, 2014, Tucson, AZ, 23 pages.

Kelsey, et al., "*Employing ionomer-based membrane pair technology to extract water from urine*," $42^{nd}$ International Conference on Environmental Systems, Jul. 15-19, 2012, San Diego, CA, 20pages.

Kelsey, et al., "*Inspiration Mars ETDU Water Management System Test Results*," $44^{th}$ International Conference on Environmental Systems, Jul. 13-17, 2012, Tucson, AZ, 28pages.

Kelsey, et al., "*Purifying Water Mined from Asteroids for In Situ Resource Utilization*," Paragon Space Development Corporation, 23 pages.

International Search Report and Written Opinion, International Application No. PCT/US2015/013829, mailed May 8, 2015, 9 pages.

Written Opinion, International Application No. PCT/US2015/013829, mailed Jan. 29, 2016, 6 pages.

U.S. Non Final Office Action, mailed Jul. 7, 2015, issued in U.S. Appl. No. 14/609,735.

U.S. Notice of Allowance, mailed Apr. 1, 2016, issued in U.S. Appl. No. 14/609,735.

U.S. Notice of Allowance, mailed Aug. 3, 2016, issued in U.S. Appl. No. 15/194,391.

* cited by examiner

Section B-B: Pinch Seam

Section C-C: Lap Seam

IONOMER-MEMBRANE WATER PROCESSING APPARATUS

PRIORITY CLAIM

This application is a continuation-in-part of U.S. patent application Ser. No. 15/194,391, filed Jun. 27, 2016, entitled "IONOMER-MEMBRANE WATER PROCESSING APPARATUS," which is a continuation of U.S. patent application Ser. No. 14/609,735, filed Jan. 30, 2015, now U.S. Pat. No. 9,399,195, entitled "IONOMER-MEMBRANE WATER PROCESSING APPARATUS" which claims priority to U.S. Provisional Patent Application No. 61/934,382 filed Jan. 31, 2014 and entitled "Contaminant Robust In Situ Water Extractor Systems," each of which is hereby incorporated by reference in its entirety and for all purposes.

STATEMENT REGARDING FEDERALLY SPONSORED RESEARCH OR DEVELOPMENT

Some embodiments of this invention were developed with United States Government Support under NNX11CB47C, NNX11CH41P, and NNX12CA10C awarded by The National Aeronautics and Space Administration (NASA). The Government has certain rights in the invention.

TECHNICAL FIELD

This disclosure relates to extracting water from wastewater, and more particularly to extracting water from urine or brine using ionomer-microporous membrane technology for liquid and gas separation.

BACKGROUND

One of the most important resources for human support is potable water. Large populations in our world lack access to potable water and access to adequate sanitation. In addition, potable water is important for long-term human missions in space, where such water may be vital for consumption, hygiene, and maintenance. Since supplies of potable water may not be readily available, water reclamation to generate potable water from wastewater is essential. Sources of wastewater in long-term space missions can consist of hygiene water, laundry water, humidity condensate, brines, and human waste (e.g., urine). Due to the high cost of delivering supplies to space, recovery of potable water from wastewater may be critical to life support of crew members. Long duration space missions to the moon, Mars, and near-Earth asteroids may be mass-constrained and may require robust and reliable life support hardware. Closing the water loop on long duration space missions can be crucial to reducing mission mass, cost, and logistics support for orbiting facilities and planetary spacecraft.

Water recovery from wastewater is not only important in space applications, but can also be important in terrestrial applications. Such terrestrial applications of water recovery can include water recycling in arid regions, water treatment for disaster relief, greywater recycling onboard ships, and water recycling at long-term military outposts, ships, and submarines.

One type of wastewater for closing the water loop can include urine. On the International Space Station (ISS), urine may be stabilized using pretreatment chemicals, such as chromium trioxide and sulfuric acid, at a waste collection system. Typically, water can be recovered from the pretreated urine using a Vapor Compression Distillation (VCD) system. The VCD system is capable of recovering about 75% of water from the pretreated urine. However, the VCD system is very complex and uses several moving parts. Furthermore, the VCD system produces brine that requires further processing for water recovery.

Due to the VCD system's complexity and reduced capacity, membrane technology has been developed to simplify water purification systems. One such membrane-based strategy is reverse osmosis membrane technology and another such membrane-based strategy is forward osmosis membrane technology. While both reverse osmosis membranes and forward osmosis membranes may be effective in limiting surfactants, both are unable to reject urea, which is a small, uncharged contaminant molecule typically found in urine. As a result, such membranes may be supplemented with a second process capable of filtering out urea. Osmotic distillation and membrane distillation technology may be used to reject urea, but are not effective in limiting low-surface tension fluids, such as surfactants. When integrated together, this leads to the complexity and costs of water recovery from wastewater. Also, having to use different systems to treat different streams of wastewater can present problems from a mass, power, cost, logistics, and volume perspective. A single practical process that is capable of extracting purified water from urine in a single step may be beneficial in closing the water loop.

SUMMARY

The systems, methods and devices of this disclosure each have several innovative aspects, no single one of which is solely responsible for the desirable attributes disclosed herein.

One innovative aspect of the subject matter described in this disclosure can be implemented in a water processing apparatus for treating wastewater. The water processing apparatus can include a containment unit for holding the wastewater, where the containment unit includes a first layer forming the interior of the containment unit and a second layer over the first layer and exposed to the ambient environment. The first layer includes a hydrophobic microporous membrane, and the second layer includes an ionomer membrane.

In some implementations, the ionomer membrane includes Nafion®. In some implementations, the hydrophobic microporous membrane includes polytetrafluoroethylene (PTFE). In some implementations, the first layer has a first surface area and the second layer has a second surface area, the ratio of the first surface area to the second surface area being between about 1.25:1 and about 1:1.25. In some implementations, the first layer is impermeable to liquids and solids of the wastewater but permeable to gases and vapors of the wastewater, and the second layer is permeable to water vapor but impermeable to one or more contaminants of the gases and vapors.

Another innovative aspect of the subject matter described in this disclosure can be implemented in a water recovery system for treating wastewater and recovering water. The water recovery system can include a housing structure and one or more containment units for holding wastewater and supported in the housing structure. The housing structure can include a gas inlet for receiving a first gas stream into the housing structure and a gas outlet for delivering a second gas stream out of the housing structure, where the second gas stream includes water. Each of the containment units can include a first layer forming the interior of the containment unit and a second layer over the first layer and exposed to the ambient environment of the housing structure. The first layer can include a hydrophobic microporous membrane and the second layer can include an ionomer membrane.

In some implementations, the ionomer membrane includes Nafion®. In some implementations, the hydrophobic microporous membrane includes PTFE. In some implementations, the first layer has a first surface area and the second layer has a second surface area, where the ratio of the first surface area to the second surface area is approximately 1:1. In some implementations, water vapor partial pressure inside the housing structure is less than the water vapor partial pressure inside the containment units. In some implementations, the relative humidity of the second gas stream is greater than the relative humidity of the first gas stream. In some implementations, the first layer is impermeable to liquids and solids of the wastewater but permeable to gases and vapors of the wastewater, and the second layer is permeable to water vapor but impermeable to one or more contaminants of the gases and vapors.

Another innovative aspect of the subject matter described in this disclosure can be implemented in a water processing apparatus for treating wastewater. The water processing apparatus can include a containment unit for holding the wastewater, where the containment unit includes a first layer forming the interior of the containment unit and a second layer over the first layer and surrounding the first layer to enclose the first layer. The first layer includes a hydrophobic microporous membrane, and the second layer includes an ionomer membrane. The first layer is sealed to itself to enclose the wastewater in the first layer, where the first layer has a first surface area and the second layer has a second surface area, the ratio of the first surface area to the second surface area is approximately 1:1.

In some implementations, the ionomer membrane comprises a fabric-reinforced Nafion®. In some implementations, the hydrophobic microporous membrane comprises laminated expanded polytetrafluoroethylene (ePTFE). In some implementations, the first layer is heat sealed to itself by a thermoplastic material. The first layer is sealed to itself to enclose the wastewater with a lap seam and the first layer is further sealed to itself to enclose the wastewater with one or more pinch seams. In some implementations, a geometry of the first layer and the second layer of the containment unit is a spiral-wound geometry. In some implementations, a geometry of the first layer and the second layer of the containment unit is a pleated geometry. In some implementations, a geometry of the first layer and the second layer of the containment unit is a tube-and-shell geometry.

Another innovative aspect of the subject matter described in this disclosure can be implemented in a method for treating wastewater. The method includes flowing wastewater into a containment unit, where the containment unit includes a first layer forming the interior of the containment unit and a second layer over the first layer and surrounding the first layer to enclose the first layer. The first layer includes a hydrophobic microporous membrane and the second layer includes an ionomer membrane, where the first layer has a first surface area and the second layer has a second surface area, where a ratio of the first surface area to the second surface area is approximately 1:1. The method further includes treating the wastewater in the containment unit by permeating gases and vapors of the wastewater through the first layer and retaining liquids and solids of the wastewater inside the first layer, delivering a gas stream over the second layer of the containment unit so that a water vapor partial pressure outside the containment unit is less than a water vapor partial pressure inside the containment unit, and collecting water vapor from the gases and vapors into the gas stream based on at least a difference between the water vapor partial pressure outside the containment unit and inside the containment unit.

In some implementations, the ionomer membrane comprises fabric-reinforced Nafion®, and the hydrophobic microporous membrane comprises laminated expanded polytetrafluoroethylene (ePTFE). In some implementations, a geometry of the first layer and the second layer is selected from a group consisting of: a spiral-wound geometry, a pleated geometry, and a tube-and-shell geometry. In some implementations, the first layer is heat sealed to itself by a thermoplastic material. In some implementations, the first layer is heat sealed to itself with one or more of a lap seam and a pinch seam.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

To reclaim water from wastewater, a water processing apparatus can be provided that can extract purified water in a single step. The extracted water can meet water quality standards, such as having a limited amount of total organic carbon, total inorganic carbon, total dissolved solids, ammonium, urea, methanol, ethanol, propylene glycol, acetate, sulfate, formate, and other contaminants. The amount of extracted water from the wastewater can also be significant. For example, the water processing apparatus can be capable of extracting over 75% of the water from the wastewater. For example, the water processing apparatus may be capable of extracting equal to or greater than about 85% of the water from brine, and extracting equal to or greater than about 98% of the water from urine. The water processing apparatus can be capable of using limited power and limit the use of consumable components.

Wastewater can come from a variety of sources, including but not limited to humidity condensate from air conditioning systems, hygiene water, seawater, polluted water, greywater, brine, and urine. Human urine can include several different inorganic salts, urea, organic ammonium salts, and other organic compounds. Human urine also includes water, the percentage of which can vary from person to person. Typical samples of urine can be augmented to match that of a typical crew member of the ISS, where the percentage of non-water compounds can be less than 20% and the percentage of water can be greater than 80% in terms of mass fraction of the urine. For example, pretreated, augmented urine can include 6.06% of non-water compounds and 93.94% of water, where the urine can be pretreated with sulfuric acid and chromium trioxide to prevent bacterial and mold growth and trap ammonium in solution as non-volatile ammonium ions. In some implementations, water recovery techniques may be utilized to purify water from urine. In some other implementations, water recovery techniques may be utilized to purify water from brine. For example, the brine can be a form of concentrated urine, where pretreated urine can be processed in a primary water processor to become brine. Then the brine can be further processed by the water processing apparatus of the present disclosure. The effectiveness of the present disclosure can be evaluated in terms of the amount of water recovery from the wastewater and the product water purity.

Figure 1:
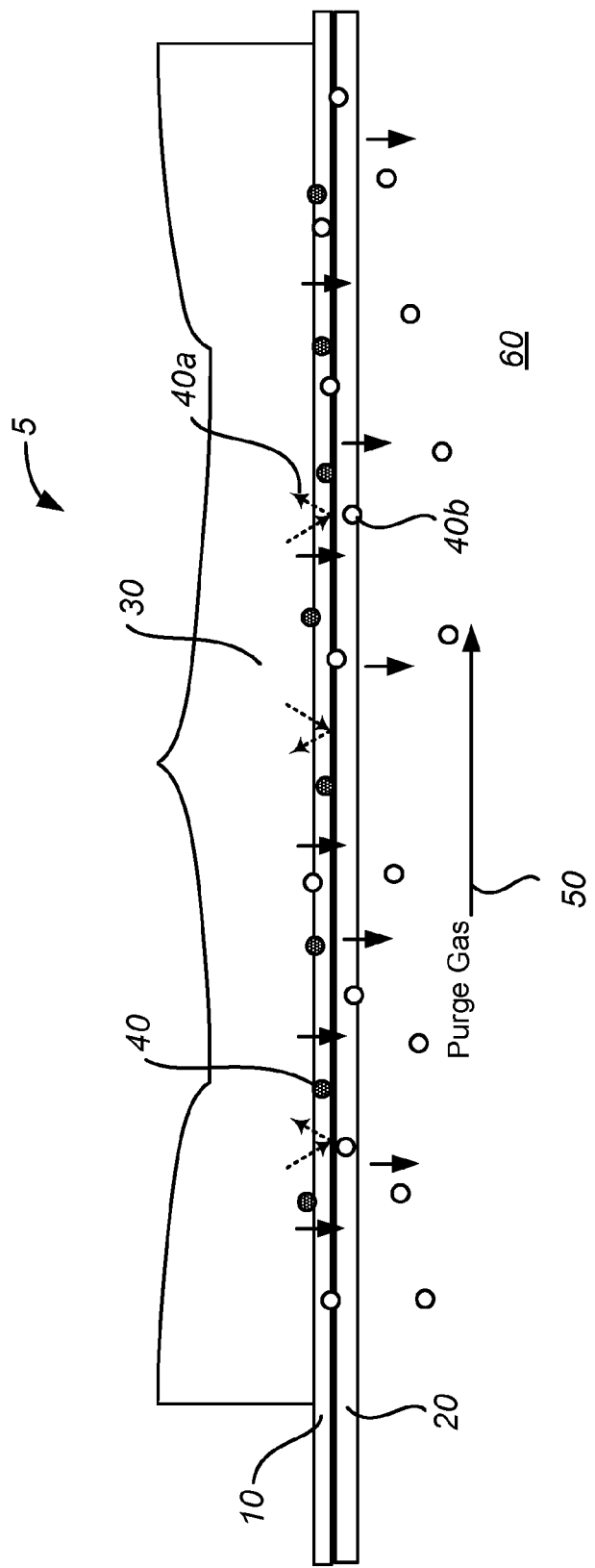
FIG. 1 shows a schematic diagram illustrating an example water processing apparatus including an ionomer and hydrophobic microporous membrane pair for extracting water from wastewater.

The present disclosure provides for wastewater processing using membrane technology. FIG. 1 shows a schematic diagram illustrating an example water processing apparatus including an ionomer and hydrophobic microporous membrane pair for extracting water from wastewater. A water processing apparatus 5 for extracting water from wastewater 30 can include a first layer 10 over a second layer 20. The first layer 10 can include a hydrophobic microporous membrane and the second layer 20 can include an ionomer membrane. The first layer 10 and the second layer 20 can form an ionomer-microporous membrane pair that can be used in water recovery processes for a variety of applications, including space and terrestrial applications. The first layer 10 can be impermeable to liquids and solids of the wastewater 30 but permeable to gases and vapors 40 of the wastewater 30. The second layer 20 can be permeable to water vapor 40b but impermeable to one or more contaminants 40a of the gases and vapors 40.

In some implementations, the hydrophobic microporous membrane of the first layer 10 can include polytetrafluoroethylene (PTFE) or, more specifically, expanded PTFE (ePTFE). PTFE, sometimes referred to as "Teflon," can serve as a hydrophobic microporous membrane that prevents liquid wastewater 30 from coming into contact with the second layer 20. The PTFE in the first layer 10 may prevent liquid wastewater 30 from passing but may permit gases and vapors 40 to pass through. PTFE is hydrophobic and does not allow any liquid to pass through its pores without significant backpressure. In addition, PTFE has high temperature limits and will generally not degrade at temperatures below about 250° C. PTFE is also very chemically inert and highly resistant to corrosion. In some implementations, PTFE is able to handle heated, highly concentrated brine without any chemical corrosion or with minimal chemical corrosion. In some implementations, the PTFE can be derived from Teflon manufactured by General Electric of Fairfield, Conn. An example of PTFE can be derived from fabric of the product name eVent®, which can be manufactured by the BHA Group, a subsidiary of General Electric. The eVent® product is commercially available in different porosities and thicknesses, which can affect permeation rates.

In some implementations, the ionomer membrane of the second layer 20 can include a sulfonated perfluorinated ionomer, such as Nafion®. The ionomer membrane of the second layer 20 serves as a chemically-selective membrane that allows compounds that bind to the sulfonic acid groups to readily permeate through the second layer 20, including water. The ionomer membrane is a chemically-sensitive membrane in that it selectively passes water through the ionomer membrane based on chemical affinity. Rather than selectively removing water or other gases based on molecular size, the ionomer membrane can remove water and other gases based on chemical affinity. For example, the ionomer membrane can remove water and other gases based on their chemical affinity for sulfonic acid groups.

Nafion® is a copolymer of tetrafluoroethylene and perfluoro-3,6-dioxa-4-methyl-7-octene-sulfonic acid. It is an inert fluorocarbon polymer with ionic channels of sulfonic acid groups scattered throughout. Nafion® is highly resistant to chemical attack, as only alkali metals such as sodium are known to degrade Nafion® under normal temperatures and pressures. In fact, strong acids may be used to regenerate Nafion® if it has been exposed to solutions containing cations. Because of its inertness, Nafion® can be safely disposed in landfills. Nafion® does not burn in ambient air and is more flame-resistant than most other plastics, with a limiting oxygen index of 95%. Nafion® sheets are commercially available through Ion Power, Inc., which is a distributor of Nafion® under E. I. du Pont de Nemours and Company of Wilmington, Del. Different types and thicknesses of Nafion® are commercially available, which can affect the permeation rates.

Nafion® includes a bulk fluorocarbon matrix with exposed sulfonic acid groups immobilized in the bulk fluorocarbon matrix. Unlike the fluorocarbon matrix, the sulfonic acid groups do not participate in chemical reactions. As a result, the sulfonic acid groups provide several important properties to Nafion®. First, Nafion® functions as an acid catalyst due to the strongly acidic properties of the sulfonic acid group. Second, Nafion® functions as an ion exchange resin when exposed to liquid solutions. Third, Nafion® can readily absorb water, from the vapor phase or the liquid phase. Each of the sulfonic acid groups can absorb up to 13 molecules of water. The sulfonic acid groups can form ionic channels through the fluorocarbon polymer, and water can be easily transported through these channels. Thus, Nafion® can serve as a selective, semi-permeable membrane to water vapor. In some implementations, the Nafion® of the second layer 20 can be provided as a sheet or sheets. In some implementations, the Nafion® can be solution-casted onto the first layer 10. In some implementations, the Nafion® of the second layer 20 can be provided as tubes that can form Nafion® tube walls. Nafion® tubes may be commercially available through Perma Pure LLC of Toms River, N.J.

Nafion® can serve as a selective, semi-permeable membrane to water vapor for water purification because the sulfonic acid groups can pass water while rejecting other compounds, making it possible to separate water from a contaminated source. The fact that Nafion® acts as an ion exchange resin when exposed to liquids implies that Nafion® is more effective processing gases rather than liquid solutions. Liquid solutions containing cations can reduce the effectiveness of the permeability of Nafion® by supplanting the hydrogen ions of sulfonic acid groups with the solution cations. Given these properties, the pores in the PTFE of the first layer 10 selectively prevent liquid wastewater 30 from passing through, but allow gases and vapors 40 to pass. As a result, liquid wastewater 30 does not reach the Nafion® of the second layer 20. When gases and vapors 40 encounter the Nafion® of the second layer 20, the Nafion® selectively permeates water vapor 40b while blocking or otherwise "retaining" the volatiles 40a of other compounds. As used herein, "retaining" means that the volatiles of the compounds do not pass through the membrane of the second layer 20. The retained volatiles 40a can include contaminants such as ammonia, alkanes, alkenes, alkynes, double and triple-bonded organic compounds, and benzene, among others. Some of the retained volatiles 40a may be retained by converting into another compound, where some compounds may be susceptible to acid catalysis, for example.

In operation, the wastewater 30 can be in contact with the first layer 10. In some implementations, the wastewater 30 can include urine, hygiene water, humidity condensate, seawater, greywater, brine, or other contaminant solution. In some implementations, the wastewater 30 is urine. In some other implementations, the wastewater 30 is brine. The brine can be a form of concentrated urine, where the brine can be received after processing urine by a primary water processor. The urine may be pretreated to prevent bacterial and mold growth and trap ammonia in solution as non-volatile ammonium ions. The first layer 10 may limit solid and liquid solution of the wastewater 30 from passing through, but may permit vapors and gases 40 to pass through.

The second layer 20 may be directly disposed, positioned, formed, or otherwise placed on the first layer 10. In some implementations, the first layer 10 and the second layer 20 are in contact with one another. In other words, the first layer 10 and the second layer 20 can be sandwiched together. This can form an ionomer membrane and hydrophobic microporous membrane pair. In some implementations, the second layer 20 is exposed to an ambient environment 60. Of the vapors and gases 40 to pass through the first layer 10, the second layer 20 can block or substantially retain volatiles 40a that are unable to permeate through the second layer 20. The rate of loss of some of the volatiles 40a can depend on how readily the volatiles 40a will undergo acid catalysis. Table 1 summarizes a list of chemicals that are retained or at least partially retained by Nafion®.

TABLE 1

| Chemical | Retention with Nafion ® |
|---|---|
| Ammonia | Variable losses in the form of ammonium hydroxide |
| Ammonium Hydroxide | Over 90% loss |
| Acetaldehyde | Retained |
| Acetic Acid | Over 90% loss due to acid catalysis |
| Acetone | Over 90% loss |
| Acetonitrile | 75% loss |
| Acrolein | Variable losses |
| Anisole | Retained |
| Benzaldehyde | 75% loss |
| Benzene | Retained |
| Benzonitrile | 50% loss |
| Boron Trifluoride | Retained |
| Bromoform | Retained |
| Carbon Dioxide | Retained |
| Carbon Bisulfide | Retained |
| Carbon Monoxide | Retained |
| Chlorine | Retained |
| Chloroethane | Retained |
| Chloroform | Retained |
| Crotonaldehyde | Over 90% loss |
| Cumene | Retained |
| Diacetyl | Over 90% loss |
| Diethyl Carbitol | Variable losses |
| Dimethylformanide | Over 90% loss |
| Dimethylacetamide | Over 90% loss |
| Dioxane | Over 90% loss |
| DMS | Retained |
| DMSO | Over 90% loss |
| Ethane | Retained |
| Ethanol | Over 90% loss |
| Ethyl Acetate | 15% loss |
| Ethyl Amyl Ketone | 20% loss |
| Ethyl Benzene | Retained |
| Ethyl Ether | Over 90% loss |
| Ethylene | Retained |
| Ethylene Oxide | 50% loss |
| Fluorine | Retained |
| Fluorobenzene | Retained |
| Formaldehyde | Retained |
| Formic Acid | Variable loss |
| Helium | Retained |
| Heptane | Retained |
| Hexane | Retained |
| Hydrogen | Retained |
| Hydrogen Chloride | Retained with high purge |
| Hydrogen Cyanide | Retained |
| Hydrogen Fluoride | Retained |
| Hydrogen Sulfide | Retained |
| Isopropyl Benzene | Retained |
| Isobutyl Acetate | Over 90% loss |
| Isovaleric Acid | Variable losses |
| MEK | Over 90% loss |
| Mesitylene | Retained |
| Methane | Retained |
| Methanol | Over 90% loss |
| Methyl Acetate | Retained |
| Methyl Bromide | Retained |
| Methyl Chloride | Retained |
| Methyl Isobutyl Ketone | Over 90% loss |
| Methyl Methacylate | Retained |
| Methyl Nitrate | Variable losses |
| Methyl Sulfide | Retained |
| Nitrobenzene | 30% loss |
| Nitrogen | Retained |
| Nitrogen Dioxide | Retained |
| Octane | Retained |
| Oxygen | Retained |

TABLE 1-continued

| Chemical | Retention with Nafion ® |
|---|---|
| Ozone | Retained |
| Propane | Retained |
| Phosgene | Retained |
| Propionic Acid | Variable losses |
| Propylene | Retained |
| Propylene Oxide | 25% loss |
| Pyridine | Retained |
| Sulfur Dioxide | Retained |
| Tetrahydrofuran | Over 90% loss |
| Thiosinamine | Over 90% loss |
| Toulene | Retained |
| Trichloroethene | Retained |
| Water | Over 90% loss |
| Xylene | Retained |

The Nafion® of the second layer 20 may block or substantially retain volatiles 40a that come from the wastewater 30. The Nafion® of the second layer may allow other vapors and gases 40 to pass, including water vapor 40b. Of note, alcohols, ammonium hydroxide, primary amines, and secondary amines may selectively permeate through the Nafion® of the second layer 20, driven by their vapor pressure gradients. Even though some volatiles 40a may pass through both membranes, the contamination of the permeated water vapor 40b may be minimal based on total organic carbon (TOC), ammonia, ammonium, and pH measurements.

The water vapor 40b can pass through the second layer 20 by being driven by a partial pressure differential. In some implementations, the water vapor partial pressure in the ambient environment 60 is less than the water vapor partial pressure inside the second layer 20. Water molecules of the water vapor 40b can bind to the sulfonic acid groups of the Nafion® in the second layer 20, and then pass through by the partial pressure differential. Rapid transfer through the second layer 20 can keep the partial pressure between the first layer 10 and the second layer 20 low, allowing for high diffusion through the first layer 10.

The water vapor partial pressure differential is the driving force for permeation of water vapor 40b. The larger the differential, the higher the potential for permeation. The water vapor partial pressure differential can be maintained by a dry sweep gas flowing over the second layer 20. As illustrated in the example in FIG. 1, a purge gas 50 can flow through the ambient environment 60 to sweep the water vapor 40b. The purge gas 50 can flow across the surface of the second layer 20 to pick up the water vapor 40b and transport the water vapor 40b. In some implementations, the water vapor 40b can be transported to a condenser (not shown). In some implementations, the purge gas 50 can include air, such as room air delivered by a fan or compressor. However, it is understood that the purge gas 50 can include any gas that has as water vapor partial pressure that is lower than the water vapor partial pressure inside the second layer 20. For example, the purge gas 50 can include one or more of nitrogen ($N_2$), carbon dioxide ($CO_2$), hydrogen ($H_2$), and inert gas.

The flow rate, temperature, and relative humidity of the purge gas 50 can be adjusted to increase the permeation of the water vapor 40b from the wastewater 30 to the ambient environment 60. For example, increasing the flow rate of the purge gas 50 can increase the permeation of the water vapor 40b and prevent saturation. Increasing the temperature can increase the permeation of the water vapor 40b to counteract the effects of evaporative cooling. Decreasing the relative humidity of the purge gas 50 can increase the permeation rate of water vapor 40b.

The permeation of water vapor 40b may also be affected by other factors. In some implementations, the level of hydration of the Nafion®, the phase of water on the side of the wastewater 30, interfacial transport, surface area ratio of the first layer 10 to the second layer 20, membrane thicknesses, and porosity of the PTFE membrane can affect the permeation of water vapor 40b.

With respect to surface area ratio of the first layer 10 to the second layer 20, high permeation rates can be achieved when the first layer 10 has a similar surface area as the second layer 20. For example, comparative permeation rates through PTFE and Nafion® reveal relatively similar permeation rates. Thus, neither the PTFE nor the Nafion® membranes require substantially greater surface areas than the other to get the permeation rates to be the same. Hence, the first layer 10 can have a first surface area and the second layer 20 can have a second surface area, where the ratio of the first surface area to the second surface area can be between about 1.25:1 and about 1:1.25, or about 1:1.

Regarding the thicknesses of the membranes, thicker membranes generally mean more diffusion resistance. Regarding the porosity of the PTFE membrane, larger pores typically provide greater permeation rates. Selective membrane testing revealed that while the membrane combination having the highest permeation rate was the combination of the PTFE membrane having an average pore size of 1 μm and the Nafion® membrane having a thickness of 25.4 μm, the combination was structurally unstable during handling. However, the membrane combination having a higher permeation rate than the rest of the membrane combinations was the combination of the PTFE membrane having an average porosity of 0.45 μm and the Nafion® membrane having a thickness of 50.8 μm, even if the pore size were higher or the Nafion® thickness was smaller. In some implementations, the permeation flux rate of water vapor can be greater than $8.0 \times 10^{-5}$ kg/s*$m^2$, or greater than $1.0 \times 10^{-4}$ kg/s*$m^2$.

As the water vapor 40b permeates from the Nafion® of the second layer 20, the retained wastewater 30 can turn into residual brine solids or sludge. If the mass fraction of the wastewater is over 80% water and if most of the water is permeated through the second layer 20 of the water processing apparatus 5, then what remains of the wastewater 30 will be mostly solid. The solid can be safely stored to facilitate ease of handling and disposal.

Figure 2A:
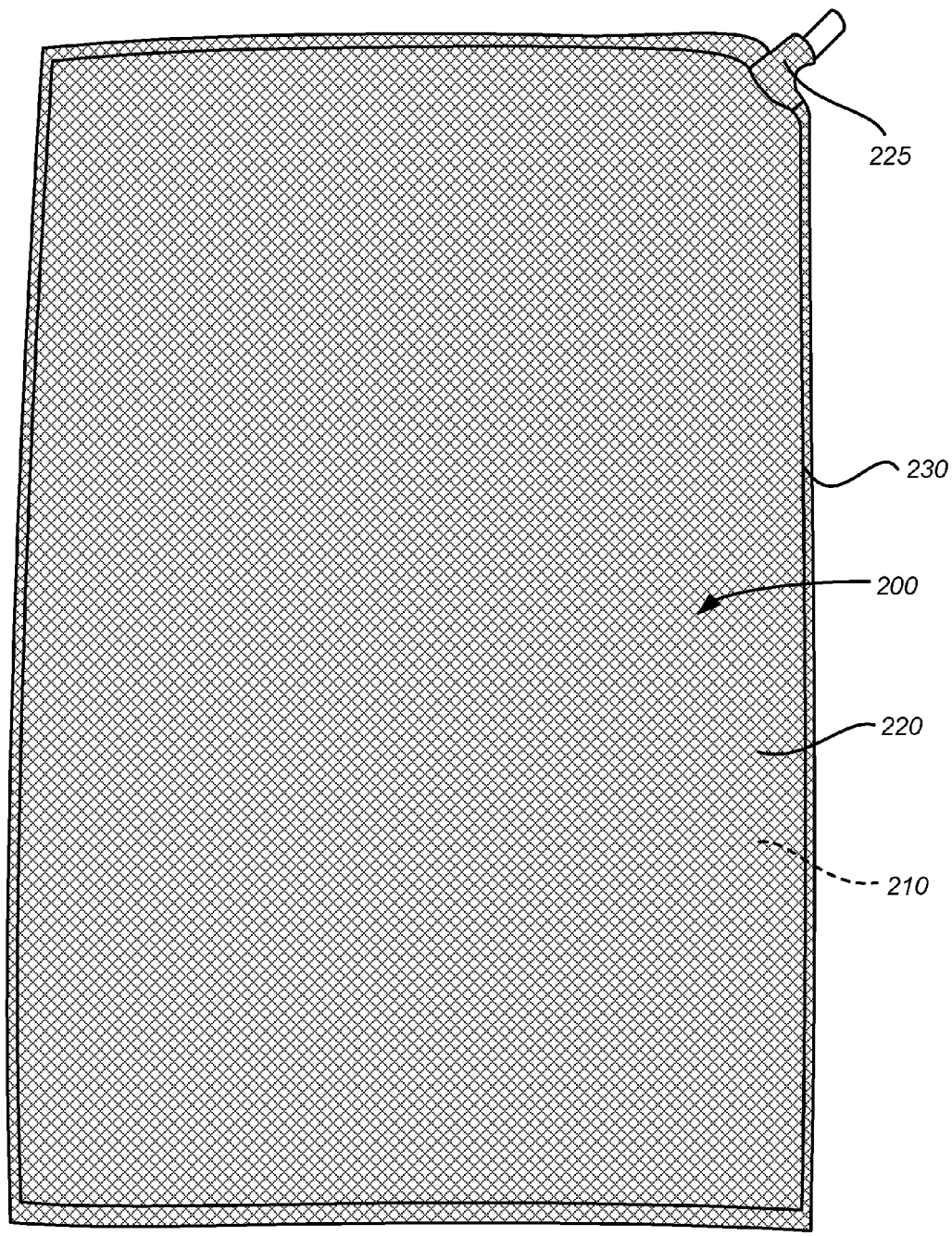
FIG. 2A show a top plan view of an example containment unit for holding and treating wastewater for water recovery.
Figure 2B:
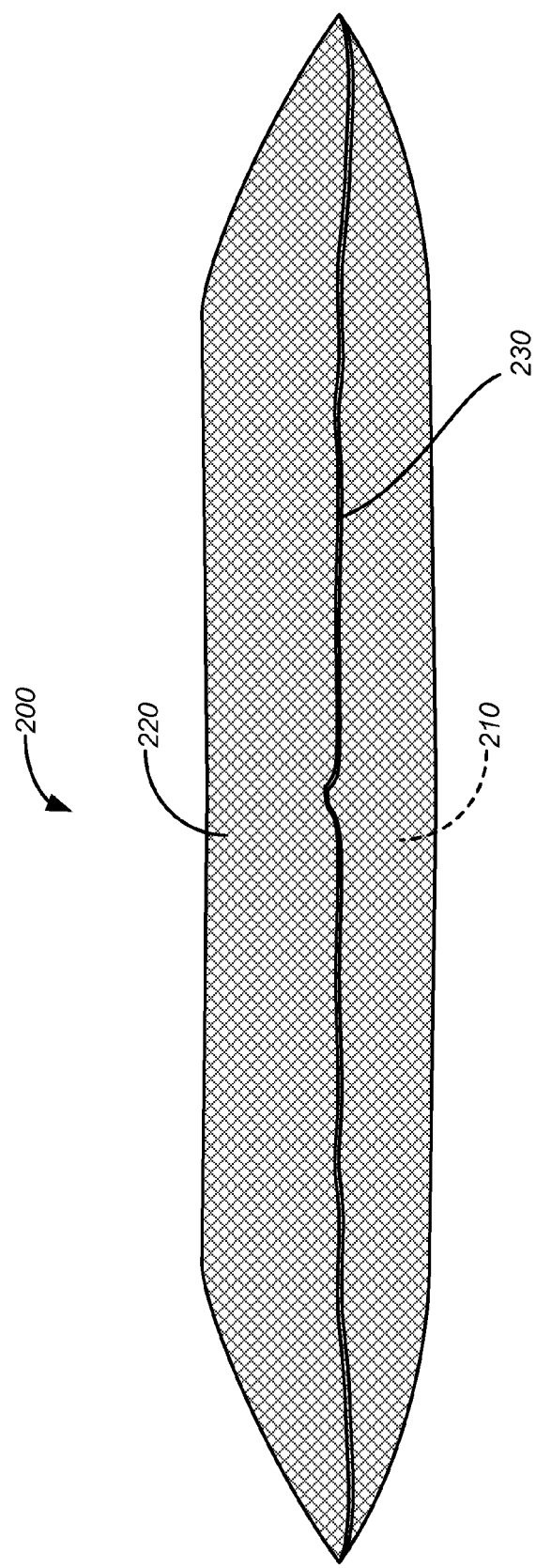
FIG. 2B shows a side view of the containment unit in FIG. 2A for holding and treating wastewater for water recovery.

The water processing apparatus 5 described in FIG. 1 may be part of a containment unit for holding and treating wastewater 30. In some implementations, such a containment unit can be a bag or inflatable bladder sealed from the ambient environment 60. It will be understood, however, that the containment unit can take on a variety of different designs, shapes, and geometries. FIG. 2A show a top plan view of an example containment unit for holding and treating wastewater for water recovery. FIG. 2B shows a side view of the containment unit in FIG. 2A. The containment unit 200 can include an ionomer membrane 220 and a hydrophobic microporous membrane 210. The ionomer membrane 220 can be a sheet that is exposed to the ambient environment outside of the containment unit 200, and the hydrophobic microporous membrane 210 can be a sheet that forms the interior of the containment unit 200. The sheet of the hydrophobic microporous membrane 210 can be folded over itself and the sheet of the ionomer membrane 220 can be sealed to the hydrophobic microporous membrane 210 to form a four-sided envelope. A seal 230 can be formed around the edges of the containment unit 200 to enclose the containment unit 200. In some implementations, the containment unit 200 can be sealed using an adhesive, heat sealing, or a mechanical seal such as a clamp. The interior of the containment unit 200 may be in contact with wastewater, such as urine or brine. In some implementations, the containment unit 200 may include a receptacle 225 for receiving the wastewater. The receptacle 225 may serve as a fill port accessing the interior of the containment unit 200 so that wastewater can be introduced inside the containment unit 200. As shown in FIG. 2B, the containment unit 200 may be inflated and hold the wastewater.

In the containment unit 200, the surface areas of the hydrophobic microporous membrane 210 and the ionomer membrane 220 can be relatively similar. The sheet of the ionomer membrane 220 can overlay and surround the sheet of the hydrophobic microporous membrane 210. In some implementations, a surface area ratio of the hydrophobic microporous membrane 210 to the ionomer membrane 220 can be between about 1.25:1 and 1:1.25. In some implementations, the surface area ratio can be approximately 1:1. By having relatively similar surface areas, a permeation rate of the water vapor through the containment unit 200 can be optimized.

The dual membranes of the containment unit 200 form two chemically resistant layers that provide at least two layers of protection. Additional layers or membranes can be added for increased protection. The containment unit 200 is durable, portable, and effectively encloses the wastewater inside the containment unit 200. In some implementations, this allows for ease of handling and disposal by crew members. That way, the solids and remaining wastewater in the containment unit 200 can be safely handled and disposed of without further processing because the containment unit 200 serves as a self-containing storage.

Figure 3:
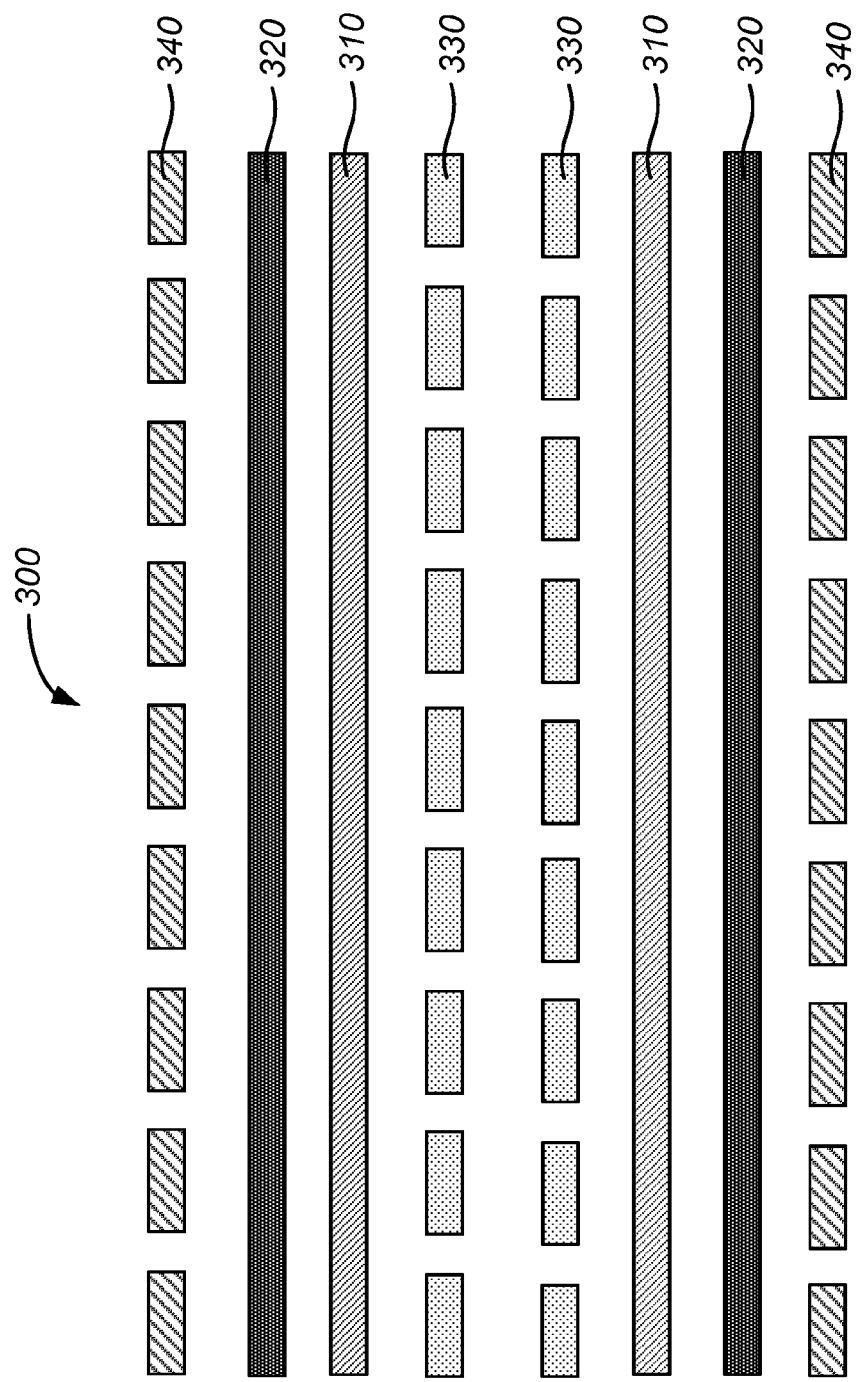
FIG. 3 shows a schematic of various layers in an example containment unit configured to hold and treat wastewater for water recovery.

FIG. 3 shows a schematic of various layers in an example containment unit configured to hold and treat wastewater for water recovery. FIG. 3 represents a cross-sectional schematic showing the arrangement of layers 310, 320, 330, and 340 with respect to one another in the containment unit 300. A first layer 310 can include a hydrophobic microporous membrane and can be folded on itself to form the interior of the containment unit 300. In some implementations, the hydrophobic microporous membrane can be PTFE. A second layer 320 can include an ionomer membrane and can be disposed, positioned, formed, or otherwise placed on the first layer 310. Thus, the second layer 320 can surround the first layer 310 on all sides of the containment unit 300. In some implementations, the ionomer membrane can be a sulfonated perfluorinated ionomer, such as Nafion®. The second layer 320 can be exposed to the ambient environment.

In order to seal the containment unit 300, a sealing material 330 can be provided in the interior of the containment unit 300. The sealing material 330 can be provided on the first layer 310 so that the first layer 310 can be sealed to itself. The sealing material 330 can be chemically resistant to concentrated brine in the wastewater to prevent leakage of the containment unit 300. In some implementations, the sealing material 330 includes a thermoplastic, such as polypropylene. The polypropylene can be melted and seep into the pores of the first layer 310 so that the first layer 310 can be sealed to the second layer 320 as well. Thus, a weld can be formed in sealing the first layer 310 to itself and between the first layer 310 and the second layer 320. The weld can be formed along the edges of the containment unit 300. This can be shown in the seal 230 in FIGS. 2A and 2B. In some other implementations, the sealing material 330 can be an adhesive.

An outer layer 340 can be provided on the second layer 320 to provide structural support and reinforcement. The outer layer 340 can form the exterior of the containment unit 300, while allowing the second layer 320 to still be exposed to the ambient environment. In some implementations, the outer layer 340 can include a thermoplastic, such as polyethylene. The polyethylene can strengthen the containment unit 300 so that it is less likely to tear. More specifically, the polyethylene on each side can support the layers 310, 320 to prevent stretching when it is pressurized by fluid weight or pressure for ease of handling. The outer layer 340 can provide a third layer of protection on top of the first layer 310 and the second layer 320. In some implementations, the outer layer 340 can be provided as netting or mesh surrounding the second layer 320 on all sides of the containment unit 300.

From the inside to the outside, one side of the containment unit 300 includes a sealing material 330 such as smooth polypropylene netting, a first layer 310 such as PTFE, a second layer 320 such as Nafion®, and an outer layer 340 such as polyethylene netting. The other side of the containment unit 300 can be symmetrical with respect to the order of the layers 330, 310, 320, and 340. In some implementations, heat sealing or welding can seal all of the layers 330, 310, 320, and 340 together around the edges to enclose the containment unit 300. In some other implementations, an adhesive or a mechanical seal can seal all of the layers 330, 310, 320, and 340 together to enclose the containment unit 300.

One or more containment units may be positioned in an apparatus for extracting water into a gas stream. For example, the one or more containment units can be supported in a housing structure, where the housing structure provides a dry environment for maintaining a water vapor partial pressure differential. A gas stream can flow over the one or more containment units. In some implementations, the housing structure can include materials that are liquid and gas impermeable, and also have a high chemical resistance. Some implementations of the housing structure can be made of rigid materials and some other implementations of the housing structure can be made of soft or flexible materials.

Figure 4A:
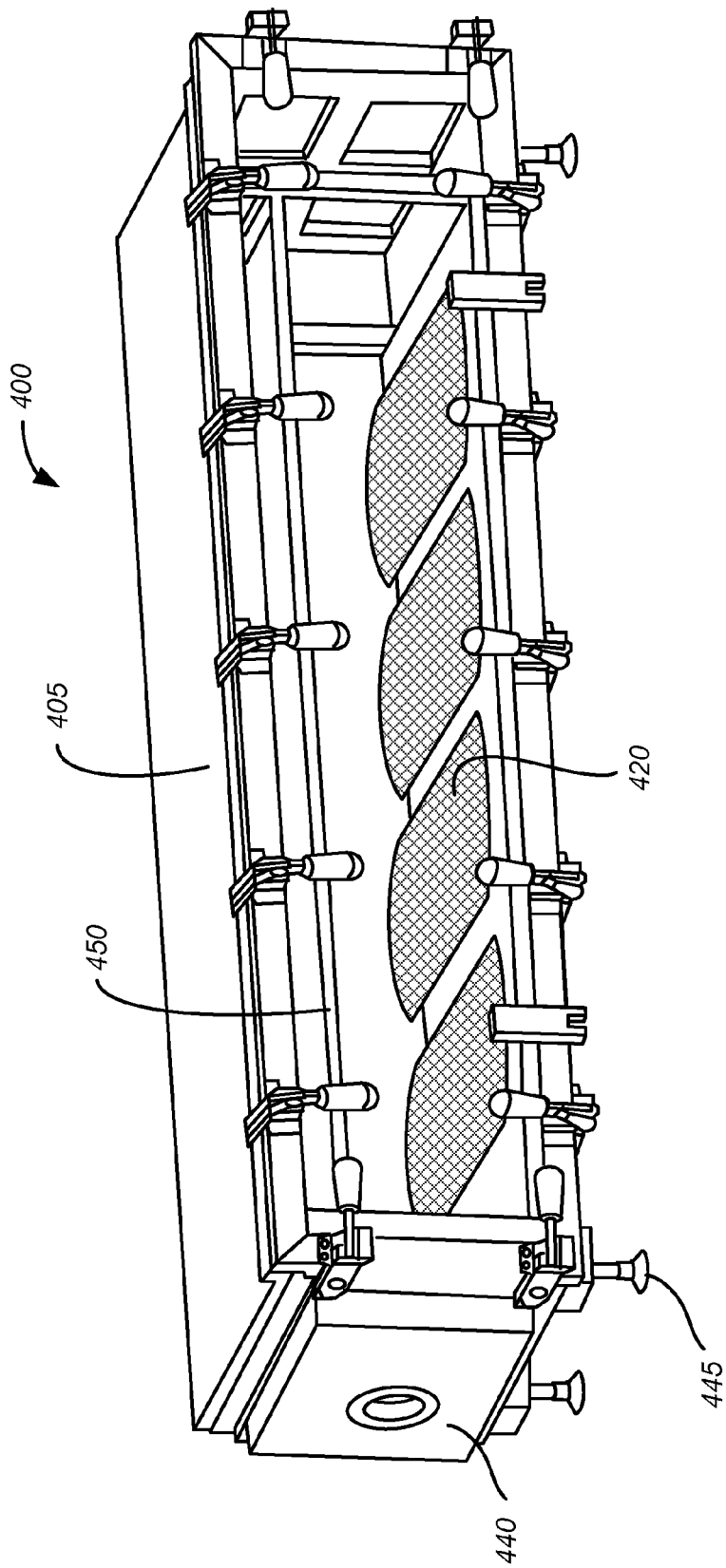
FIG. 4A shows an example water processing apparatus including a rigid housing structure supporting containment units configured to hold and treat wastewater for water recovery.
Figure 4B:
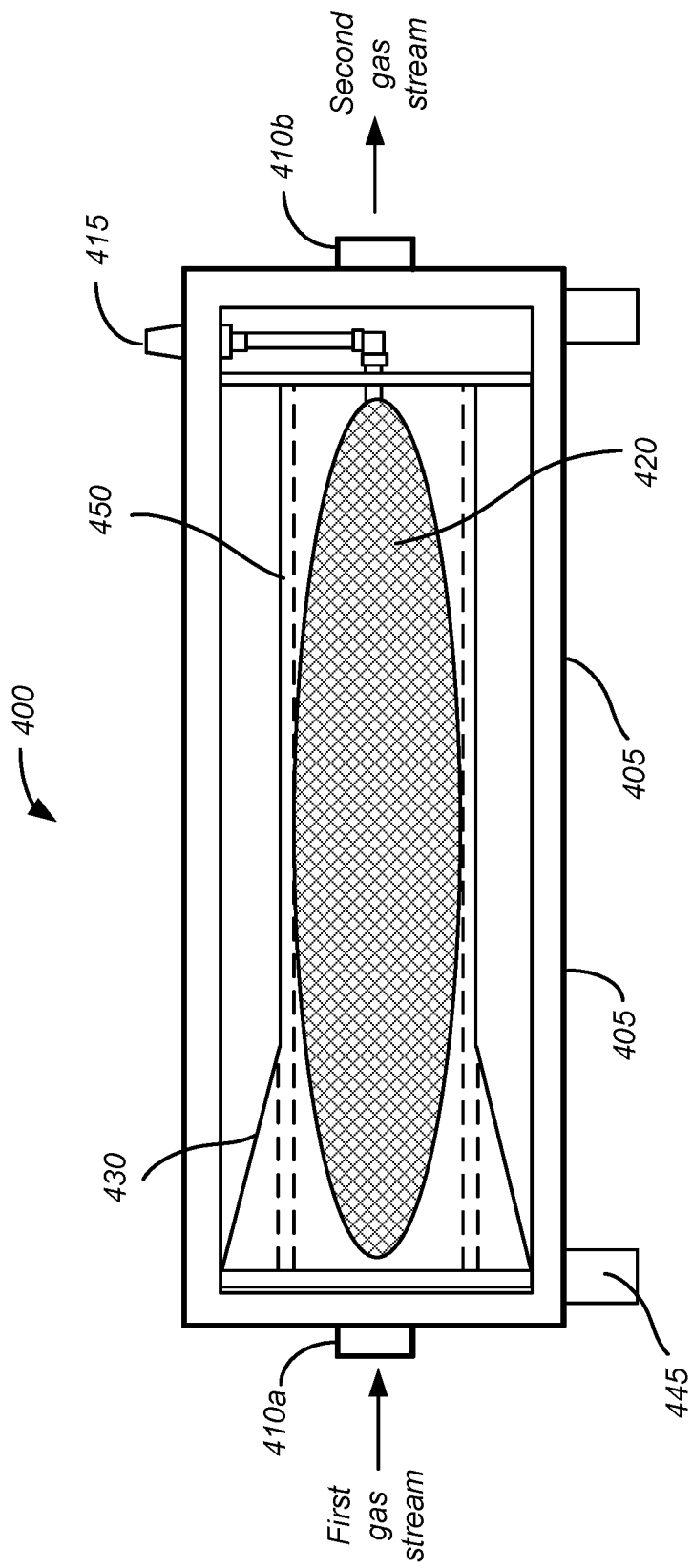
FIG. 4B shows a schematic of the example water processing apparatus of FIG. 4A including a rigid housing structure supporting a containment unit configured to hold and treat wastewater for water recovery.

FIG. 4A shows an example water processing apparatus including a rigid housing structure supporting containment units configured to hold and treat wastewater for water recovery. FIG. 4B shows a schematic of the water processing apparatus of FIG. 4A. The water processing apparatus 400 includes a containment chamber or housing structure 405, where a first end of the housing structure 405 includes a gas inlet 410a and a second end of the housing structure 405 includes a gas outlet 410b. The gas inlet 410a may be configured to receive a first gas stream into the housing structure 405, and a gas outlet 410b may be configured to deliver a second gas stream out of the housing structure 405. The second gas stream includes water. In some implementations, the relative humidity of the second gas stream exiting the housing structure 405 is greater than the first gas stream entering the housing structure 405.

The water processing apparatus 400 further includes one or more containment units 420 for holding and treating wastewater for water recovery. In some implementations, the one or more containment units 420 can be a bag or inflatable bladder. However, it will be understood that the one or more containment units 420 can have other designs, shapes, and geometries. The one or more containment units 420 can include an ionomer membrane, such as Nafion®, and a hydrophobic microporous membrane, such as ePTFE. The ionomer membrane can overlay and surround the hydrophobic microporous membrane to form a membrane pair. The one or more containment units 420 may be supported inside the housing structure 405. In some implementations, the one or more containment units 420 may be placed on a cage, platform, or other support structure 450 inside the housing structure 405. The cage, platform, or other support structure 450 may be removable for ease of handling.

The housing structure 405 may include feedthroughs for the first and second gas streams, connections for wastewater flow, instrumentation (e.g., sensors, thermocouples, etc.), and one or more doors to insert/remove the one or more containment units 420. As illustrated in FIG. 4B, the one or more containment units 420 may be fluidly coupled to a wastewater inlet 415 for receiving wastewater from a wastewater supply (not shown). In some implementations, the wastewater (e.g., urine or brine) can flow from the wastewater supply and into the one or more containment units 420 via the wastewater inlet 415. For example, a pump or compressor can meter brine into the containment units 420 from a brine storage tank.

In addition, the housing structure 405 may include instrumentation such as thermocouples for temperature control and monitoring. At least one of the thermocouples may be positioned on the one or more containment units 420 and used for feedback control for maintaining the one or more containment units 420 at a desired temperature. In some implementations, the one or more containment units 420 are maintained at a temperature above room temperature to overcome effects of evaporative cooling. Additional thermocouples may be positioned in the housing structure 405 to monitor the temperature of the housing structure 405 and other components.

In some implementations, the housing structure 405 may include one or more doors 440 for inserting and removing the one or more containment units 420. In some implementations, the one or more doors 440 can be made of polymethylpentene (PMP), which is a thermoplastic that is semi-transparent and chemically resistant to a variety of compounds. A fluoroelastomer (FKM) may be used as the sealing mechanism for the one or more doors 440. In some implementations, the housing structure 405 may include feet or support components 445. The support components 445 may provide clearance for hinges and for the one or more doors 440 to easily open. In some implementations, at least some portions of the housing structure 405 may be transparent or semi-transparent to allow for visibility for monitoring the one or more containment units 420. In some implementations, the housing structure 405 can be made of a weldable thermoplastic, such as polyvinylidene (PVDF), which can be referred to as Kynar. PVDF exhibits excellent chemical resistance to a variety of compounds, including chromic, sulfuric, and phosphoric acid.

Other parts of the housing structure 405 may be made out of polypropylene, PVDF, PTFE sealant, and hydrophobic PTFE filters. The hydrophobic PTFE filters may be positioned in the housing structure 405 to provide containment in case of a brine leak and also to provide pressure drop for adequate flow distribution. Joints in the housing structure 405 may be sealed using PTFE to limit leakage of wastewater. It is understood that those of ordinary skill in the art may design the housing structure 405 using other materials or configurations considering issues such as design preference, cost, performance requirements, system requirements, safety requirements, available materials, technological advances, etc.

A first gas stream may flow into the housing structure 405 through the gas inlet 410a, where the first gas stream may flow over the surfaces of each of the containment units 420. In some implementations, the first gas stream can include air, such as room or cabin air. The first gas stream can help maintain a water vapor partial pressure differential in the housing structure 405. When the first gas stream enters through the gas inlet 410a, a flap 430 may divert flow of the first gas stream gas into the housing structure 405 to maintain constant flow channels while the containment units 420 deflate during drying. The flap 430 may include ePTFE and may be located at the top of the support structure 450. The flap 430 may divert the first gas stream to a channel just above the surface of the one or more containment units 420, maintaining velocity for mass transfer as the height of the one or more containment units 420 decreases.

After the first gas stream sweeps across the containment units 420, the first gas stream captures water vapor and is flowed towards the gas outlet 410b. After collecting the water vapor from the containment units 420, the first gas stream becomes a second gas stream upon exiting the gas outlet 410b. The second gas stream includes water, where the relative humidity of the second gas stream is greater than the relative humidity of the first gas stream. The second gas stream can be delivered to a condenser for collecting the water.

Figure 5:
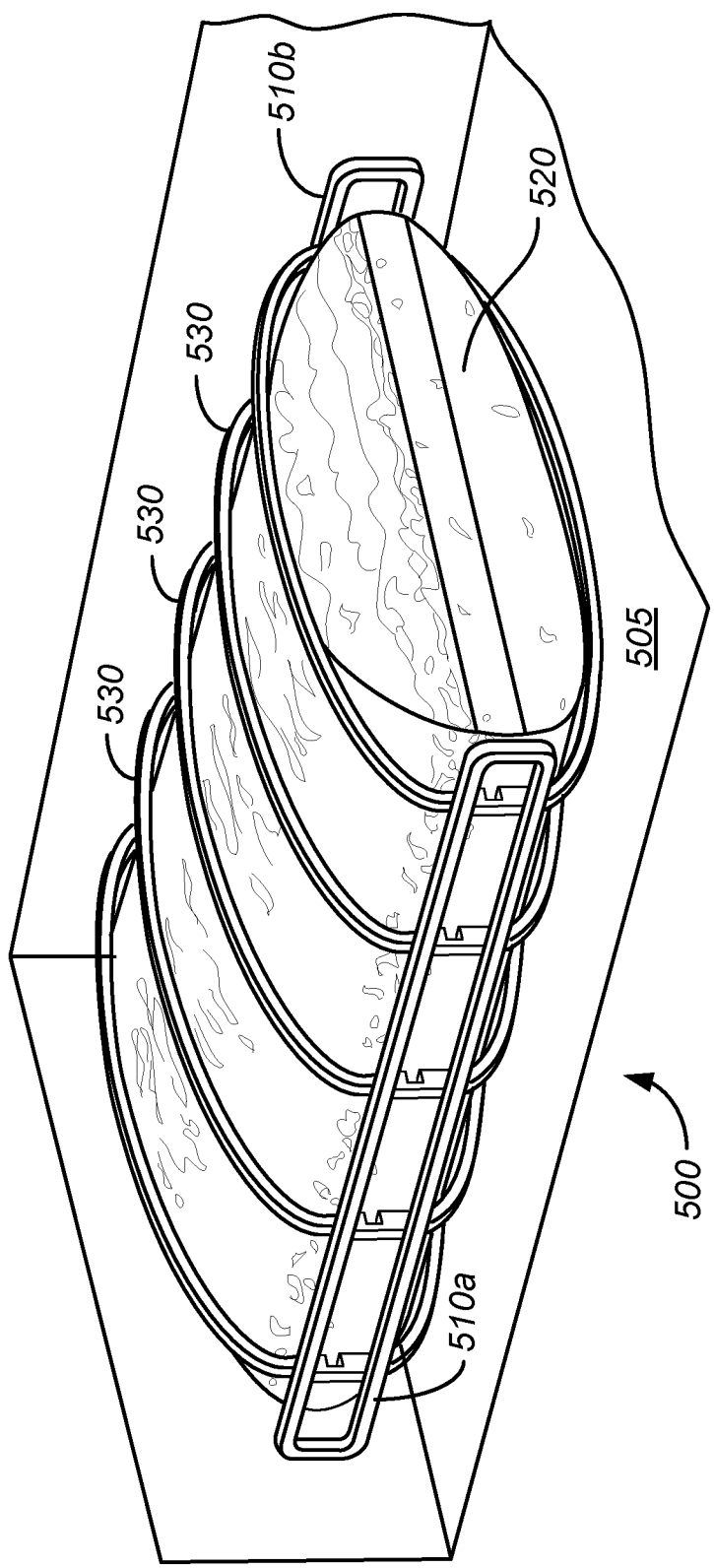
FIG. 5 shows another example water processing apparatus including a flexible housing structure supporting a containment unit configured to hold and treat wastewater for water recovery.

FIG. 5 shows another example water processing apparatus including a flexible housing structure supporting a containment unit configured to hold and treat wastewater for water recovery. In FIG. 5, the water processing apparatus 500 includes a containment unit 520, where the containment unit 520 can be a bag or inflatable bladder in some implementations. However, it will be understood that the containment unit 500 can have different designs, shapes, and geometries. The containment unit 520 can include an ionomer membrane and a hydrophobic microporous membrane. The ionomer membrane can overlay and surround the hydrophobic microporous membrane to form a membrane pair. A housing structure 505 can surround the containment unit 520 to enclose the containment unit 520, where the housing structure 505 can be made of a flexible material. The flexible material can liquid and gas impermeable. For example, the flexible material can include polypropylene or another chemically resistant plastic.

The housing structure 505 can include a gas inlet 510a and a gas outlet 510b opposite the gas inlet 510a. The gas inlet 510a may be configured to receive a first gas stream into the housing structure 505, and the gas outlet 510b may be configured to deliver a second gas stream out of the housing structure 505. The second gas stream includes water. In some implementations, the relative humidity of the second gas stream exiting the housing structure 505 is greater than the first gas stream entering the housing structure 505.

Integrated springs or support structure 530 may provide support to a flexible sheet of the housing structure 505. Rather than a rigid enclosure, the flexible sheet 505 can wrap around the support structure 530 to form the housing structure 505. The support structure 530 may provide sufficient compressive force to maintain the desired flow geometry and spacing between the flexible sheet of the housing structure 505 and the containment unit 520. The gas inlet 510a and the gas outlet 510b may direct and control flow of the first gas stream across the surface of the containment unit

520, where the first gas stream can flow between the containment unit 520 and the flexible sheet of the housing structure 505. The first gas stream can be a dry purge gas. In some implementations, as the containment unit 520 deflates, the housing structure 505 can also deflate.

After the first gas stream sweeps across the containment unit 520, the first gas stream captures water vapor and is flowed towards the gas outlet 510*b*. After collecting the water vapor from the containment unit 520, the first gas stream becomes a second gas stream upon exiting the gas outlet 510*b*. The second gas stream includes water, where the relative humidity of the second gas stream is greater than the relative humidity of the first gas stream. The second gas stream can be delivered to a condenser for collecting the water.

With respect to FIGS. 4A, 4B, and 5, the water processing apparatuses 400, 500 can be configured to provide conditions inside the housing structures 405, 505 to promote permeation of water vapor from the one or more containment units 420, 520. For example, the water processing apparatuses 400. 500 can regulate the flow of purge gas, temperature, pressure, relative humidity, and other conditions within the housing structures 405, 505. Any of the water processing apparatuses 400, 500 can include a controller (not shown) containing instructions for controlling processing conditions in the housing structures 405, 505.

The air of the first gas stream can be pre-heated to overcome the effects of evaporative cooling, and the air can be relatively dry to maintain a water vapor partial pressure differential between the containment units 420, 520 and the ambient environment. In some implementations, the air can be pre-heated above room temperature to increase the vapor pressure inside each of the containment units 420, 520, where room temperature can be between about 18° C. and about 30° C. For example, the temperature of the first gas stream can be heated to be greater than about 30° C. The increased temperature increases the vapor pressure to generate more vapors and gases from the wastewater in each of the containment units 420, 520. In addition, the first gas stream can be relatively dry. Typically, cabin air has a relative humidity between about 35% and about 45%. The water processing apparatuses 400, 500 can also maintain a water vapor partial pressure differential to promote permeation of water vapor inside the housing structures 405, 505. In other words, the water vapor partial pressure inside each of the containment units 420, 520 is greater than the water vapor partial pressure in the housing structures 405, 505. As the first gas stream flows across the surface of each of the containment units 420, 520, the first gas stream can transport water vapor away from the containment units 420, 520. Increasing the flow rate of the first gas stream can provide a continuously dry environment inside the housing structures 405, 505. The flow rate of the first gas stream can be adjusted depending on the surface area, performance requirements, etc. of the containment units 420, 520. By way of an example, the flow rate of the first gas stream can be between about 300 standard liters per minute (SLPM) and about 700 SLPM, such as about 500 SLPM, where the surface area of the containment unit 420, 520 is about 750 square inches and the desired water recovery from urine is about 98%.

In some implementations, the gas inlet 410*a* or 510*a* and the gas outlet 410*b* or 510*b* can passively control air flow across the containment unit 520. In particular, the housing structures 405, 505 may permit the flow of the first gas stream without any blower or heater, thereby reducing power consumption in the water processing apparatuses 400, 500. For example, the first gas stream may originate from sources within a larger apparatus, such as from an air duct in a spacecraft.

Figure 6A:
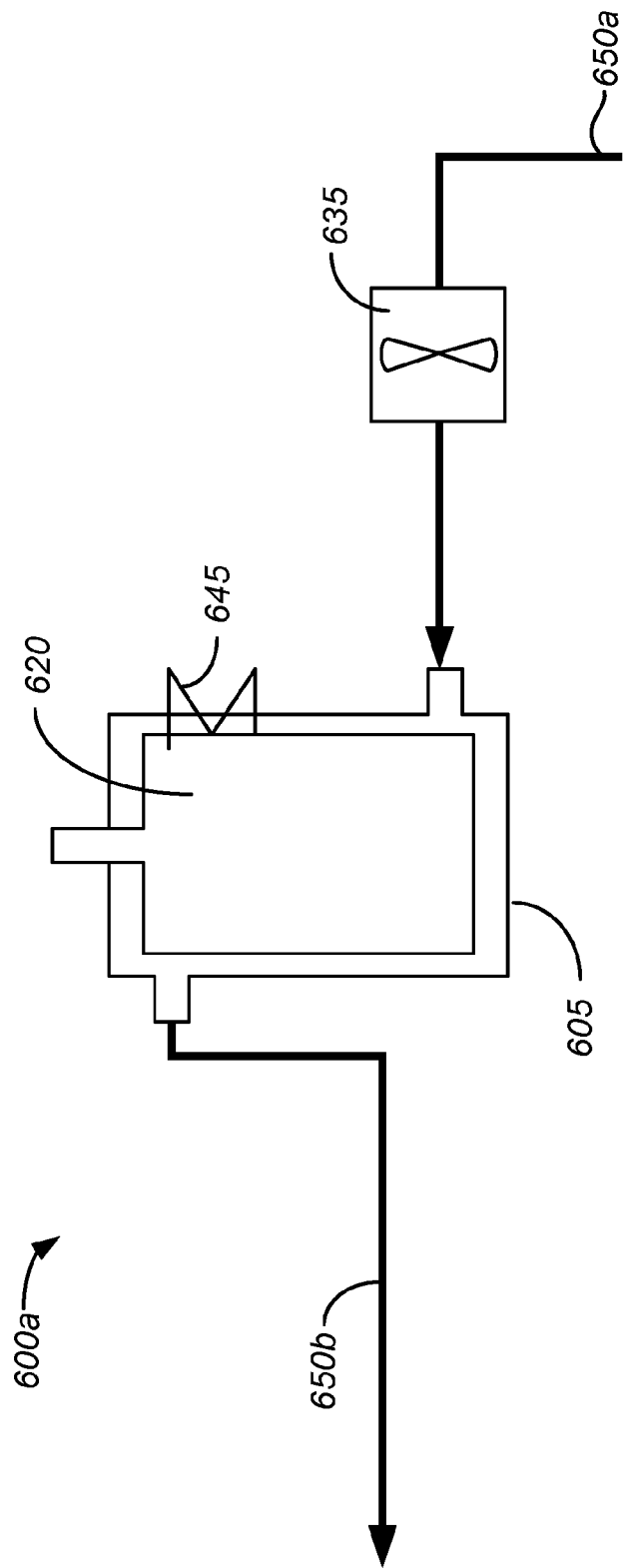
FIG. 6A shows an example schematic diagram illustrating a water processing apparatus for treating wastewater.

FIG. 6A shows an example schematic diagram illustrating a water processing apparatus for treating wastewater. The water processing apparatus 600*a* can include a housing structure 605 for containing a containment unit 620. The housing structure 605 can be similar to any of the housing structures described with respect to FIGS. 4A, 4B, and 5. The containment unit 620 can include a membrane pair of an ionomer membrane and a hydrophobic microporous membrane, as described earlier with respect to FIGS. 1-3. The containment unit 620 can be configured to hold wastewater, such as urine or brine.

A first gas stream 650*a* can be introduced into the housing structure 605. In some implementations, the first gas stream 650*a* can include cabin air originating from one or more systems of a spacecraft. The first gas stream 650*a* can be delivered into the housing structure 605 by a fan or blower 635, where the blower 635 can control the flow rate of the first gas stream 650*a* into the housing structure 605. In some implementations, the blower 635 can be equipped with a motor with a variable frequency drive to control fan speed. However, in some implementations, the water processing apparatus 600*a* can introduce the first gas stream 650*a* passively, and thereby introduce the first gas stream 650*a* without the aid of the blower 635.

In some implementations, the water processing apparatus 600*a* can include a heater 645. The heater can be utilized to heat the first gas stream 650*a* to above room temperature. In some implementations, the first gas stream 650*a* can be heated to a temperature above 30° C., or to a temperature above 50° C. The heated first gas stream 650*a* can enter the housing structure 605 to promote drying of the containment unit 620. The heated first gas stream 650*a* can heat up the temperature of the wastewater to overcome the effects of evaporative cooling, where the temperature of the wastewater can be above 30° C. However, in some implementations, the water processing apparatus 600*a* does not heat up the wastewater and may introduce the first gas stream 650*a* passively, and thereby introduce the first gas stream 650*a* without the aid of the heater 645.

The first gas stream 650*a* can transport captured water vapor permeating from the containment unit 620 to become a second gas stream 650*b*. The second gas stream 650*b* exits the housing structure 605, where the second gas stream 650*b* includes water. Over time, the containment unit 620 becomes less inflated and relatively dry. In some implementations, the water of the second gas stream 650*b* can enter the cabin of the spacecraft or flow directly towards a heat exchanger for collecting the water.

Figure 6B:
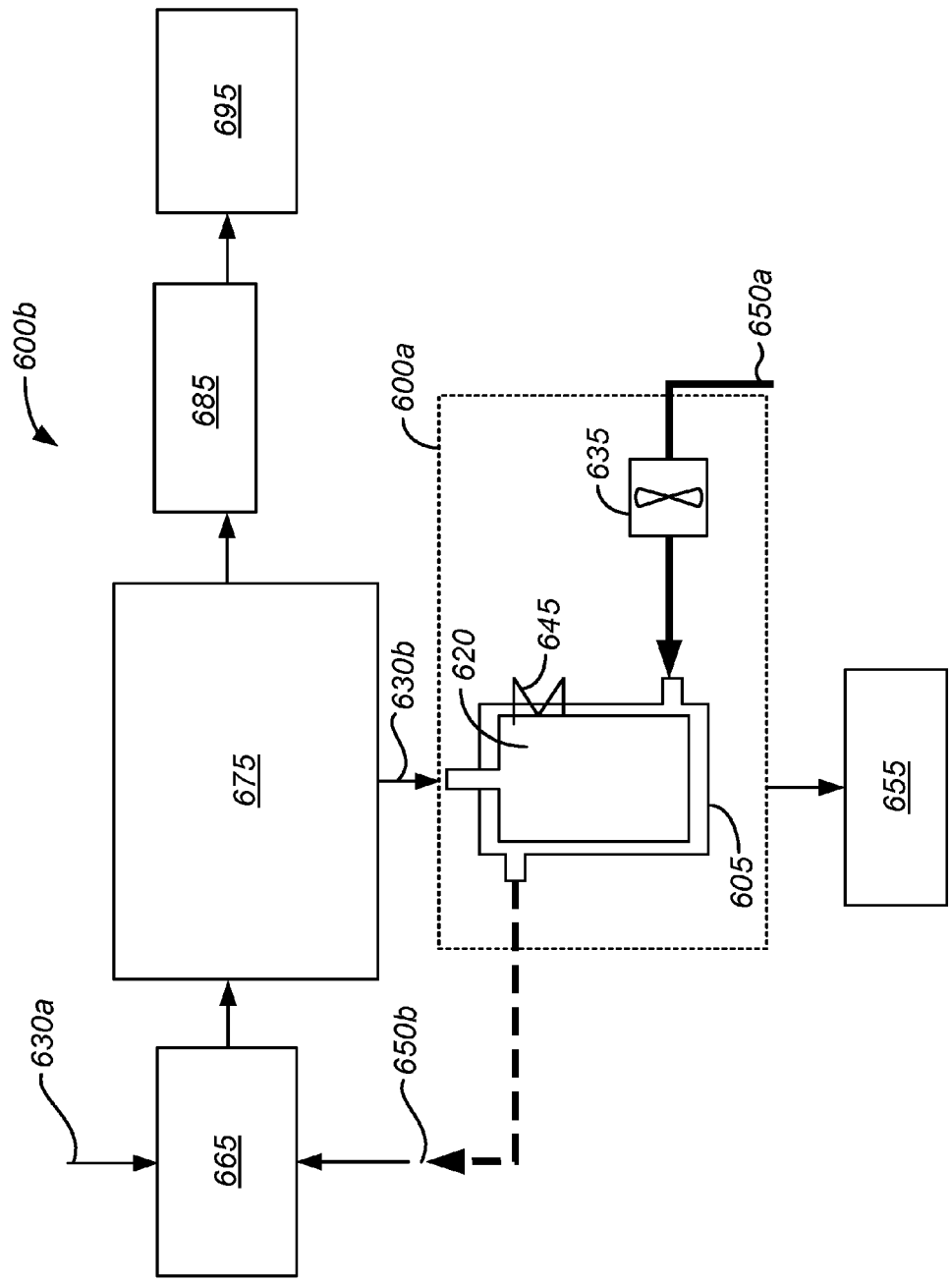
FIG. 6B shows an example schematic diagram illustrating the water processing apparatus of FIG. 6A integrated in a water recovery system.

FIG. 6B shows an example schematic diagram illustrating the water processing apparatus of FIG. 6A integrated in a water recovery system. The water recovery system 600*b* can be configured to treat wastewater and recover water. The water recovery system 600*b* can include the water processing apparatus 600*a*, where wastewater can be provided into the containment unit 620 of the water processing apparatus 600*a* from a primary water processor 675. The primary water processor 675 of the water recovery system 600*b* can receive a first wastewater 630*a* from a wastewater storage 665, where the first wastewater 630*a* can include pretreated urine. The first wastewater 630*a* can be processed by the primary water processor 675 to convert the first wastewater 630*a* to a second wastewater 630*b*, where the second wastewater 630*b* can be brine. In some implementations, the brine can be a form of concentrated urine.

After the first gas stream 650a flows over the containment unit 620 and becomes the second gas stream 650b, the second gas stream 650b exits the housing structure 605. In some implementations, the second gas stream 650b can flow back into the cabin of the spacecraft or into a heat exchanger (e.g., condenser) for extracting the water. As illustrated in FIG. 6B, the second gas stream 650b can become humidity condensate that can get further processed by the primary water processor 675, and then undergo more processing in a post-processing unit 685. After post-processing, the humidity condensate gets collected into potable water storage 695. The potable water storage 695 can be used by crewmembers of the spacecraft.

The containment unit 620 can retain brine solids/sludge, where the ionomer membrane and hydrophobic microporous membrane serve as a barrier between the brine solids/sludge and crewmembers of the spacecraft. The containment unit 620 contains the brine solids/sludge and prevents other volatiles from entering the ambient environment. The containment unit 620 can be removed into storage into a solid waste storage unit 655. In some implementations, the containment unit 620 can be disposed of without the need for further processing.

Figure 7:
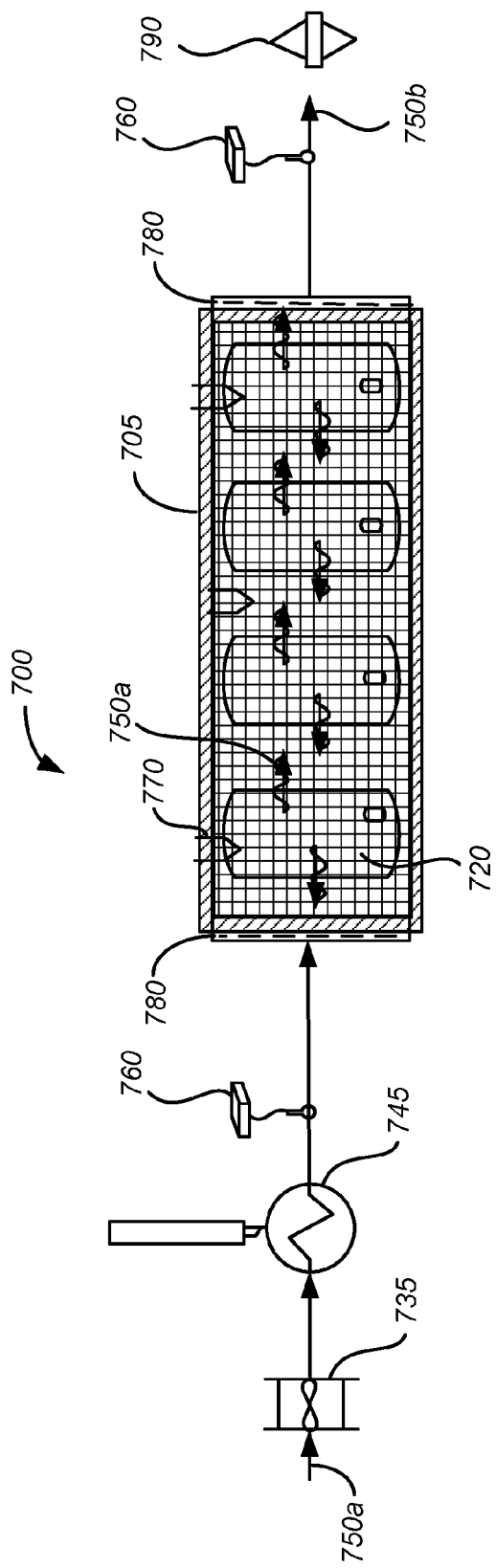
FIG. 7 shows a schematic diagram illustrating a water recovery system having containment units configured to hold and treat wastewater.

FIG. 7 shows a schematic diagram illustrating a water recovery system having containment units configured to hold and treat wastewater. The water recovery system 700 is configured to treat wastewater and recover water. The water recovery system 700 includes various devices, subsystems, components, sensors, and equipment for recovering water from wastewater. The water recovery system 700 includes a containment chamber or housing structure 705 for supporting a plurality of containment units 720. The containment chamber 705 can be similar to either of the housing structure 405, 505 described with respect to FIGS. 4A, 4B, and 5. Each of the containment units 720 can include a membrane pair of an ionomer membrane and a hydrophobic microporous membrane, as described earlier with respect to FIGS. 1-3.

A first gas stream 750a can include air that can be delivered into the containment chamber 705 by a blower 735, where the blower 735 can control the flow rate of the first gas stream 750a into the containment chamber 705. The water recovery system 700 can also include a heater 745 to heat the first gas stream 750a. The heater 745 can be positioned upstream of the containment chamber 705 and utilized to heat the first gas stream 750a above room temperature. In some implementations, the water recovery system 700 can operate passively so that the first gas stream 750a can be introduced into the containment chamber 705 without the aid of the blower 735 or the heater 745.

The water recovery systems 700 can also include instrumentation for monitoring or controlling conditions of the water recovery system 700. For example, the water recovery system 700 can include sensors 760 for measuring relative humidity entering and exiting the containment chamber 705. The relative humidity of the first gas stream 750a entering the containment chamber 705 can be less than the relative humidity of a second gas stream 750b exiting the containment chamber 705. In some implementations, a desiccant can be used to dehumidify the first gas stream 750a prior to entering the containment chamber 705. Thermocouples 770 may be located inside the containment chamber 705 to monitor the temperature of the containment chamber 705 and the containment units 720. At least one of the thermocouples 770 may be connected to a controller for the heater 745 to maintain the wastewater temperature. Other sensors can be used in the water recovery system 700 to measure relevant conditions of the gas streams 750a, 750b, such as pressure. The temperature, pressure, and relative humidity of the first gas stream 750a entering the containment chamber 705 can be compared against the temperature, pressure, and relative humidity of the second gas stream 750b exiting the containment chamber 705, which can be used for evaluating the permeation rate of the containment units 720. However, the water recovery system 700 can function without one or more of the aforementioned instrumentation. In some implementations, the conditions of the water recovery system 700 can be monitored visually.

In some implementations, the containment chamber 705 can include hydrophobic filters 780 at an inlet end and at an outlet end of the containment chamber 705. The hydrophobic filters 780 can include PTFE or some other chemically resistant material to provide secondary containment in the event of a leak or rupture of any of the containment units 720.

Wastewater can be injected into the one or more of the containment units 720. In some implementations, the wastewater can be pretreated to inhibit microbial activity, minimize precipitation of solids, and limit volatilization of contaminants such as ammonia. In some implementations, the wastewater can be pre-processed to convert pretreated urine into brine. The containment units 720 are disposable and configured to be permeable to water vapor while retaining the liquid wastewater and other volatiles inside the containment units 720. The water vapor permeation is driven by a partial pressure gradient across the permeable membrane material of the containment units 720. The partial pressure gradient can be maintained by the flow of the first gas stream 750a. The first gas stream 750a flows through the containment chamber 705 to promote drying and sweeps permeated water vapor out of the containment chamber 705. The first gas stream 750a is humidified to become a second gas stream 750b upon exiting the containment chamber 705. The humidified second gas stream 750b is delivered to a condenser 790, where the water vapor condenses so that water can be collected and processed into potable water. In some implementations, the condenser 790 can include one or more countercurrent heat exchangers. The water in the second gas stream 750b can be condensed in the condenser 790 for collection and processing into potable water.

In some implementations, the amount of water recovered from the second gas stream 750b can be equal to or greater than about 95% of the water in the wastewater (e.g., urine). This can be true when the water processing system 700 functions as the primary water processor. However, when used as a brine processor, the amount of water recovered from the second gas stream 750b can be equal to or greater than about 80% of the water in the wastewater (e.g., brine). Thus, in some implementations, the water recovery is from pretreated urine brine. In some other implementations, the water recovery is from urine wastewater. The percentage of water recovery can be calculated using the equation: % H2O recovered=(mass H2O extracted)/(mass urine processed)× 100, where the mass H2O extracted can be calculated using by taking the final mass of the containment units 720 and subtracting that from the starting mass of the containment units 720.

The recovered water can be further processed and analyzed for contaminants. For example, the recovered water can be analyzed for water quality and purity, where measurements can be taken for TOC, total dissolved solids (TDS), total coliform, and pH. For example, the recovered water can be analyzed and tested for TOC, ammonium, and pH, where the recovered water from the humidified second gas stream can have a TOC of equal to or less than about 100 mg/L, an ammonium concentration of equal to or less than about 20 ppm, and a pH between about 3 and 7. Other measurements can be taken for conductivity, acetic acid, formic acid, total inorganic carbon (TIC), and urea.

Using urine wastewater, water quality was tested after recovering water from a water recovery system as described herein. Different tests 1-7 were performed using varying chamber inlet temperatures, air flow, pressure drops, and outlet pressures. The outputs of water quality and percentage water recovery on tests 1-7 are displayed below in Table 2, where measurements of water quality were performed on the product condensate. However, water quality measurements were not available for test 1. The tests showed that the percentage water recovery was greater than 90% across all seven tests, that ammonium and pH requirements were met on all of the available tests, and that TOC requirements were met on four of the six available tests. This shows that significant contaminant reduction can be achieved using a water recovery system as described herein.

TABLE 2

| Test | Total Percent H2O Recovery | TOC (ppm) | Ammonium (ppm) | pH |
|---|---|---|---|---|
| 1 | 92% | — | — | — |
| 2 | 95% | 149 | 3.48 | 6.5 |
| 3 | 95% | 65.8 | 0.25 | 6.7 |
| 4 | 91% | 70.8 | 0.611 | 6.6 |
| 5 | 92% | 48.9 | 2.4 | 6.0 |
| 6 | 92% | 47.4 | 2.94 | 6.8 |
| 7 | 96% | 121 | 2.04 | 7.0 |

Using brine wastewater, water quality was tested after recovering water from a water recovery system as described herein. Different tests 1-2 were performed using varying temperatures, flow rates, and pressure. The different operating conditions led to different amounts of water recovery from the samples of brine. The outputs of water quality and percentage water recovery on tests 1-2 are displayed in Table 3, where measurements of water quality were performed on the product condensate. The tests showed that the percentage of water recovery was greater than 80% from brine, meaning that the total water recovery from urine was greater than 95%. The tests also showed that significant contaminant reduction can be achieved from brine using a water recovery system as described herein.

TABLE 3

| Test | Total Percent H2O Recovery | TOC (ppm) | Ammonium (ppm) | pH |
|---|---|---|---|---|
| 1 | 82% (97% from urine) | 90.3 (after 4 days) | 2.4 (after 4 days) | 3.9 (after 4 days) |
| 2 | 86% (98% from urine) | 136 (after 9 days) | 8.0 (after 9 days) | 4.1 (after 9 days) |

In some implementations, a water processing apparatus as described in the present disclosure using membrane technology can serve as a standalone water purification apparatus. In some implementations, the water processing apparatus as described in the present disclosure using membrane technology can be integrated in a larger water recovery architecture where the urine is pretreated in one or more subsystems. For example, the water processing apparatus can be integrated in the Environmental Control and Life Support Systems (ECLSS) of the ISS.

Although the foregoing disclosed systems, methods, apparatuses, processes, and compositions have been described in detail within the context of specific implementations for the purpose of promoting clarity and understanding, it will be apparent to one of ordinary skill in the art that there are many alternative ways of implementing foregoing implementations which are within the spirit and scope of this disclosure. Accordingly, the implementations described herein are to be viewed as illustrative of the disclosed inventive concepts rather than restrictively, and are not to be used as an impermissible basis for unduly limiting the scope of any claims eventually directed to the subject matter of this disclosure.

Construction of a Containment Unit

As discussed above, some embodiments of the containment unit for treating wastewater for purified water recovery can take the form of a bag or inflatable bladder. Construction of the containment unit may be optimized for its durability, robustness, resistance to leaking, and resistance to fouling, among other possible design considerations. The design, manufacturing methods, selection of materials, and other parameters may be chosen to optimize the construction of the containment unit.

In some embodiments, the containment unit may have issues upon sealing. For example, seam failure can exist where there is an incomplete seal between the ionomer membrane and the hydrophobic microporous membrane. Seam failure may be alleviated by heat sealing the membranes individually rather than all together. This allows the membranes to bond to themselves rather than forcing them to bond to unlike materials. In addition, seam failure may be alleviated by utilizing a lap seam rather than a pinch seam, as shown in FIGS. 8A and 8B.

Figure 8A:
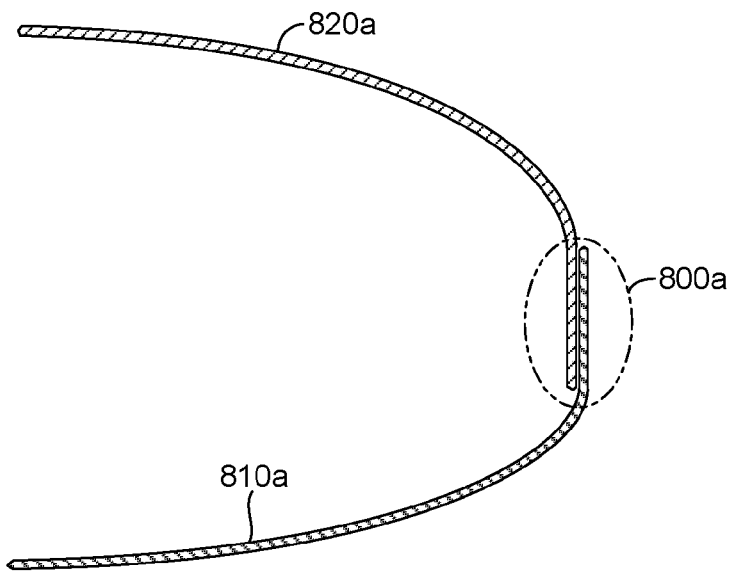
FIG. 8A shows an example schematic diagram illustrating a lap seam for a containment unit.
Figure 8B:
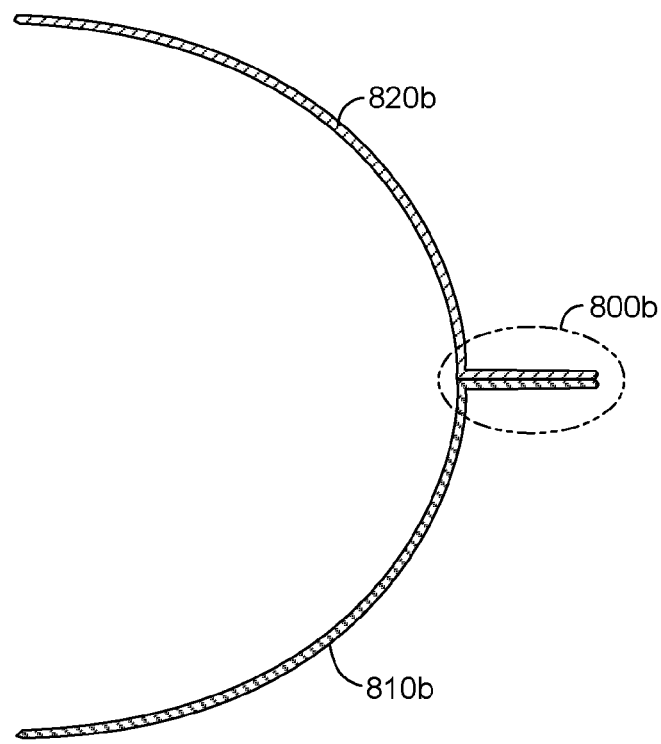
FIG. 8B shows an example schematic diagram illustrating a pinch seam for a containment unit.

FIG. 8A shows an example schematic diagram illustrating a lap seam for a containment unit. An end of a first layer 810a overlaps an end of a second layer 820a with the area of overlap 800a being in a vertical or transverse direction of a containment unit. Generally, when force is applied to the containment unit in FIG. 8A, the force pushes the two layers 810a, 820a together rather than pulling them apart, resulting in a stronger seam. FIG. 8B shows an example schematic diagram illustrating a pinch seam for a containment unit. An end of the second layer 820b overlaps an end of the first layer 810b with the area of overlap 800b being in a horizontal or planar direction of the containment unit. Typically, when force is applied to the containment unit in FIG. 8B, the force pulls the two layers 810b, 820b apart.

Figure 9A:
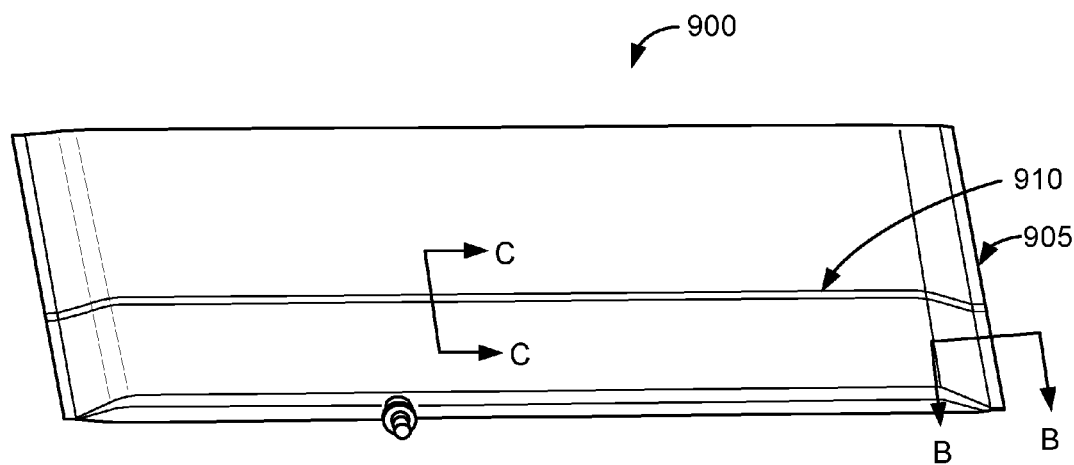
FIG. 9A shows a perspective view of an example containment unit including a lap seam and a pinch seam.

FIG. 9A shows a perspective view of an example containment unit including a lap seam and a pinch seam. A lap seam 910 closes a containment unit 900 lengthwise and at least two pinch seams 905 close the containment unit 900 at open ends along a width of the containment unit 900. The containment unit 900 can have a bag-like construction.

Figure 9B:
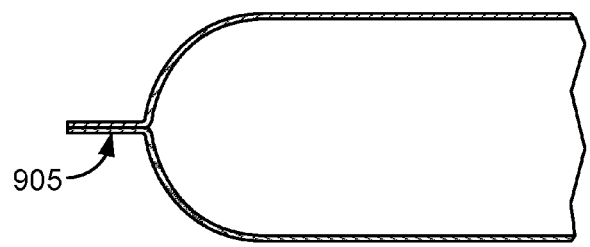
FIG. 9B shows a schematic diagram of a cross-sectional view along line B-B of FIG. 9A illustrating the pinch seam closing the containment unit.
Figure 9C:
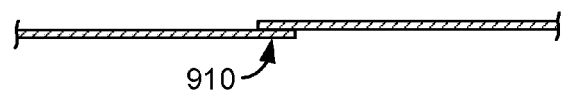
FIG. 9C shows a schematic diagram of a cross-sectional view along line C-C of FIG. 9A illustrating a lap seam closing the containment unit.

FIG. 9B shows a schematic diagram of a cross-sectional view along line B-B of FIG. 9A illustrating the pinch seam closing the containment unit. FIG. 9C shows a schematic diagram of a cross-sectional view along line C-C of FIG. 9A illustrating a lap seam closing the containment unit. In some implementations, the degree of overlap for the pinch seam 905 can be between about 0.25 inches and about 0.50 inches, and the degree of overlap for the lap seam 910 can be between about 0.25 inches and about 0.50 inches. The containment unit 900 illustrated in FIGS. 9A-9C may be vulnerable to leakage at the pinch seams 905 when subjected to a load, which can be due in part to possible film separation or tearing. However, it will be understood that the pinch seams described in this disclosure can include various types of pinch seams, some of which may reduce the risk of leakage when subjected to a load, of which the pinch seam 905 shown in FIG. 9C is one example of a type of pinch seam.

It will be understood that other possible designs and geometries may be implemented for closing a containment unit of the present disclosure. For example, the open ends of a containment unit may be sealed with a combination of a lap seam and pinch seams on the corners, or a combination of a butt and tape seam and pinch seams on the corners. Due to the seaming geometry of the lap seam or the butt and tape seam, corners at the open ends may remain open but may be closed with a diagonal pinch seam. Diagonal pinch seams at the corners are under lower peel load and possess a lower leakage risk than pinch seams shown in FIGS. 9A-9C. In some implementations, a restraint layer may be wrapped around the containment unit to reduce stress experienced by the seams at the open ends. The restraint layer may be made out of porous material to permit egress of gas. Where the containment unit has pinch seams, the restraint layer may be tightly wrapped about the pinch seams at the open ends to reduce the peel load off of the pinch seams. In some implementations, the containment unit sealed with one or more seams may include the hydrophobic microporous membrane as discussed above, and the restraint layer wrapped around the containment unit and around the seams at the open ends may include the ionomer membrane as discussed above. In some implementations, the containment unit sealed with the one or more seams may include a dual membrane including the hydrophobic microporous membrane and the ionomer membrane, and the restraint layer wrapped around the containment unit and around the seams at the open ends may include a porous polymer providing reinforcement and support for the containment unit.

Heat sealing may be used to create the aforementioned seams to close the ends of the containment unit. The strength of the seams for the containment unit may depend on the conditions for creating the heat seal. For example, a seam can be formed by bonding thermoplastic materials together, such as polypropylene to polypropylene, at an elevated temperature. A hydrophobic microporous membrane may have a layer of polypropylene to allow for the heat seal to form at the seams. The temperature for the heat seal may be elevated enough to melt the polypropylene to the polypropylene without adversely affecting other materials of the containment unit. The elevated temperature may be sufficiently elevated to seal polypropylene to polypropylene, but not too elevated to crystallize the materials that could lead to seal brittleness. Generally, a higher seal temperature increases the robustness of the seams.

The strength of the seams for the containment unit may also depend on the properties of the hydrophobic microporous membrane and the thermoplastic material on the hydrophobic microporous membrane. In some implementations, the hydrophobic microporous membrane can include ePTFE and the thermoplastic material on the hydrophobic microporous membrane can include polypropylene. The ePTFE with the polypropylene can have varying polypropylene thicknesses and ePTFE pore sizes. In some implementations, the polypropylene can have a thickness between about 0.005 inches and about 0.015 inches or between about 0.006 inches and about 0.012 inches. Thicker layers of polypropylene may lead to a more robust seam for sealing the containment unit. However, thicker layers of polypropylene on the ePTFE may present greater resistance to diffusion. In some implementations, the pore size of the ePTFE can be between about 0.05 µm and about 1.0 µm. For example, the ePTFE membrane can have a pore size of about 0.1 µm, about 0.2 µm, about 0.45 µm, or about 1.0 µm. Larger pore size is desirable for higher water vapor permeation rates, but too large of pores will allow liquids to enter the pores with only a little backpressure. This is a phenomenon that can be referred to as "intrusion pressure" or "water intrusion pressure." A water intrusion pressure (WIP) is the pressure needed to force water through the pores of the hydrophobic microporous membrane. For example, an ePTFE membrane with 0.45 µm porosity has a water intrusion pressure greater than 40 psi, while an ePTFE membrane with 1.0 µm porosity has a water intrusion pressure greater than 10 psi.

The hydrophobic microporous membrane (e.g., ePTFE) with the thermoplastic material (e.g., polypropylene) for bonding may be selected for its robustness, particularly its robustness against seam failure. Moreover, the hydrophobic microporous membrane with the thermoplastic material may be selected for its robustness without negatively affecting the intrusion pressure and the permeation rate of the membrane. The hydrophobic microporous membrane may have greater robustness with smaller pore size and increased thickness. In some implementations, the hydrophobic microporous membrane can have a pore size between about 0.1 µm and about 0.45 µm with a thickness between about 0.006 inches and about 0.012 inches. The permeation rate and the intrusion pressure of the membrane may be sufficient for water recovery purposes in the present disclosure even at such small pore sizes and large thicknesses. For example, the permeation rate for the aforementioned range of pore sizes and thicknesses can be greater than 2.0 g/hr and the water intrusion pressure can be greater than 20 psi. In some implementations, the permeation rate and the water intrusion pressure of the membrane is not significantly affected even after the containment unit undergoes various possible stresses, including stretching, twisting, creasing, squishing, rubbing, dropping, folding, and other stresses that may occur during handling. The hydrophobic microporous membrane may be selected so that any stress does not damage the material and undermine the performance of the membrane. Thus, the containment unit can be resilient to handling.

In some implementations, the hydrophobic microporous membrane may be selected as a hydrophobic ePTFE laminated membrane with a fibrous polymer backing for support. The backing material can include a non-woven coaxial fiber with a polyethylene terephthalate core and a polyethylene shell, for example. The laminated membrane may reduce the effect of pinhole-sized penetration of liquid from occurring in the hydrophobic microporous membrane due to structural deformation of the membrane. Pinholes occurring in the hydrophobic microporous membrane can come from mesh layers pressing against the hydrophobic microporous membrane, which can cause stress to the hydrophobic microporous membrane to open microporous holes within the membrane. The mesh layers can serve as protective layers or reinforcement layers for the hydrophobic microporous membrane and can help seal the seams of the membrane.

The properties of the hydrophobic microporous membrane may be selected to limit the effects of "fouling." One type of fouling of the hydrophobic microporous membrane can include surface caking, where a buildup of a layer of foulant occurs on the membrane surface, thereby limiting flux across the membrane. Another type of fouling that can occur on the hydrophobic microporous membrane can include pore blocking, where buildup of foulant occurs within pores of the hydrophobic microporous membrane. Another type of fouling that can occur on the hydrophobic microporous membrane includes wetting, where buildup of residue occurs through deposition of a foulant within pores of the membrane, thereby reducing the hydrophobic property of the surface so that liquid can freely flow through the pores of the membrane.

Properties of the membrane, such as its hydrophobicity, pore size, surface charge, and surface functional groups may influence the degree of fouling that may occur at the hydrophobic microporous membrane. Various other factors may influence the degree of fouling, such as operational conditions (e.g., flux, solution temperature, flow velocity), feed water characteristics (e.g., solution chemistry, pH, ionic strength, presence of organic and inorganic matter), and foulant characteristics (e.g., concentration, molecular size, solubility, diffusivity, charge, and hydrophobicity). While fouling of the membrane may occur during membrane distillation or operation, fouling may also occur in quiescent and unused conditions.

In some implementations, the containment unit can include a fill port or receptacle to allow the containment unit to be filled with wastewater. The fill port can be connected to a wastewater supply and a pump. The fill port can be attached to the containment unit in a manner to limit the risk of leaking near or at the fill port. In some implementations, the fill port can be a mechanically sealed fill port, where mechanical compression to seal the fill port area can provide a leak-tight seal with proper compression and gaskets around hard surfaces.

Figure 10:
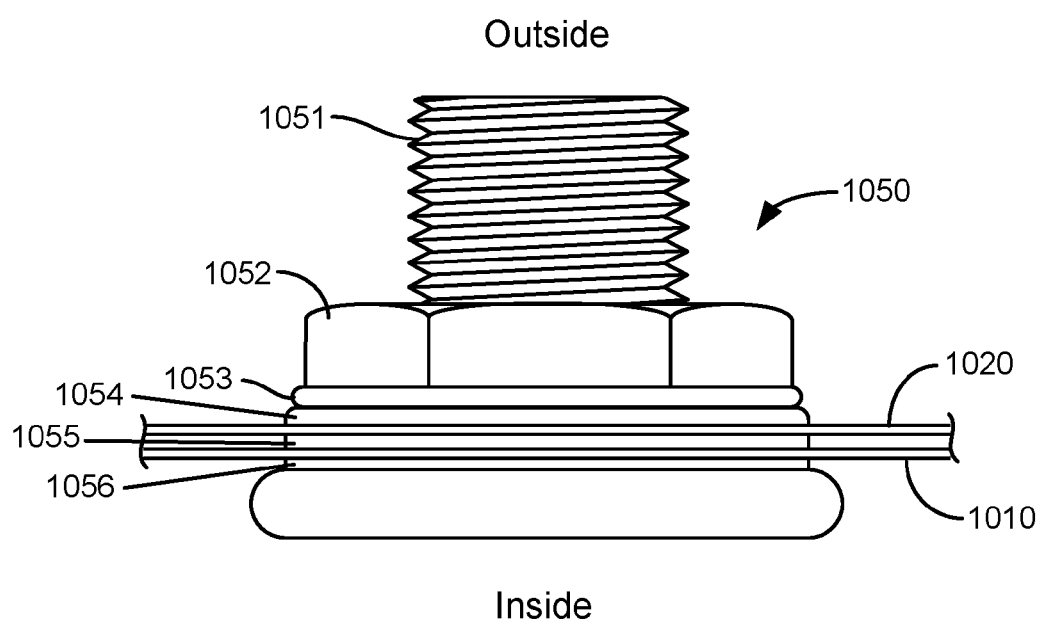
FIG. 10 shows an example schematic diagram illustrating a fill port accessing an interior of a containment unit.

FIG. 10 shows an example schematic diagram illustrating a fill port accessing an interior of a containment unit. The containment unit can be configured to treat wastewater for water recovery. A fill port 1050 can be mechanically sealed to the containment unit, where the fill port 1050 includes a body 1051 and a nut 1052, such as a bulkhead fitting, where the body 1051 and the nut 1052 are exposed to the ambient environment (i.e., outside). The body and the nut can be disposed on a washer 1053 on the outside, where the washer 1053 can ensure that the nut 1052 does not grab an underlying first gasket 1054 and cause an outer membrane 1020 to twist. In some implementations, the outer membrane 1020 can include an ionomer membrane. The washer 1053 can be disposed between the nut 1052 and the first gasket 1054 on the outside so that the nut 1052 can freely turn without the first gasket 1054 turning with the nut 1052. In some implementations, the first gasket 1054 is a fluoroelastomer gasket, such as a Viton® gasket. The containment unit for treatment of wastewater can include a dual membrane, namely the outer membrane 1020 facing the outside and an inner membrane 1010 facing the inside of the containment unit. In some implementations, the inner membrane 1010 can include a hydrophobic microporous membrane. A second gasket 1055 can be disposed between the outer membrane 1020 and the inner membrane 1010. A third gasket 1056 can be disposed on the inner membrane 1010 facing the inside of the containment unit.

As shown in FIG. 10, the fill port 1050 can be mechanically sealed to the containment unit so as to reduce the risk of leaks. Leaks from the fill port 1050 can be alleviated by changing from a welded-tube fill port to a mechanically sealed fill port 1050 as shown in FIG. 10. The fill port 1050 can be mechanically sealed to the inner membrane 1010 (or first layer) and to the outer membrane 1020 (or second layer), where the gaskets 1054, 1055, and 1056 form the mechanical seal to the inner membrane 1010 and the outer membrane 1020. The fill port 1050 of FIG. 10 can provide a tighter seal with proper compression and gaskets 1054, 1055, and 1056 around any hard surfaces.

The containment unit can include a dual membrane arrangement with a hydrophobic microporous membrane encapsulated inside an ionomer membrane. In some implementations, the ionomer membrane can wrap around the hydrophobic microporous membrane to enclose the hydrophobic microporous membrane. The ionomer membrane may be sealed to itself using any of the aforementioned seams and with any appropriate sealing technique. In some implementations, the ionomer membrane may be sealed at any of its open ends using a lap seam, pinch seam, or other type of similar seam. Specifically, inner surfaces of the ionomer membrane may seal to each other in a pinch seam, outer surfaces of the ionomer membrane may seal to each other in a pinch seam, or an outer surface may seal to an inner surface of the ionomer membrane in a lap seam. Generally, the seams of the ionomer membrane are stronger than the seams of the hydrophobic microporous membrane. When the ionomer membrane is sealed to itself, the ionomer membrane may be permanently fused. In some implementations, the ionomer membrane includes a fabric-reinforced Nafion, where the fabric-reinforced Nafion® is a version of Nafion® that is more robust than Nafion® without any fabric reinforcement. A fabric-reinforced Nafion® may be used in the containment unit without an outer protective layer or reinforcement layer. Accordingly, a containment unit can possess robustness and durability with a dual membrane arrangement including a fabric-reinforced Nafion® combined with a laminated ePTFE.

Changing Surface Area to Volume Ratio with Different Containment Geometries

The containment unit of the present disclosure can include a variety of designs, shapes, and geometries for containment of the wastewater. While aspects of the present disclosure may refer to a bag-like geometry or inflatable bladder, alternate geometries may be useful for filtration of wastewater to recover purified water. In some implementations, such alternate geometries may significantly increase a ratio of the surface area of the dual membrane (i.e., hydrophobic microporous membrane and ionomer membrane) structure to the volume of liquid wastewater when compared a bag-like geometry. The increased surface area to volume ratio in alternate geometries may allow more wastewater to be treated or processed by the containment unit. In some implementations, the alternate geometry may decrease the surface area to volume ratio when compared to a bag-like geometry. In such instances, the decreased surface area to volume ratio in alternate geometries may allow less wastewater to be treated or processed by the containment unit.

As discussed above, a containment unit can have a dual membrane of an ionomer membrane co-located with and enclosing a hydrophobic microporous membrane. The dual membrane can process wastewater to recover purified water, where contaminants of the wastewater can remain fully contained within the containment unit. While aspects of the present disclosure may package the containment unit in a bag-like geometry, other geometries are possible that have an increased surface area to volume ratio compared to the bag-like geometry. In some implementations, the containment unit can have a spiral-wound geometry. In some implementations, the containment unit can have a pleated geometry. In some implementations, the containment unit can have a tube-and-shell geometry. In some implementations, the containment unit can have a multi-layer stack geometry. It will be understood that other geometries or configurations of filtration techniques known in the art may be implemented for the containment unit. At least some of the geometries or configurations of the present disclosure may significantly increase the surface area to volume ratio of the containment unit. Such embodiments may be useful for constant-feed processing or semi-batch mode processing instead of single-use batch processing.

Figure 11A:
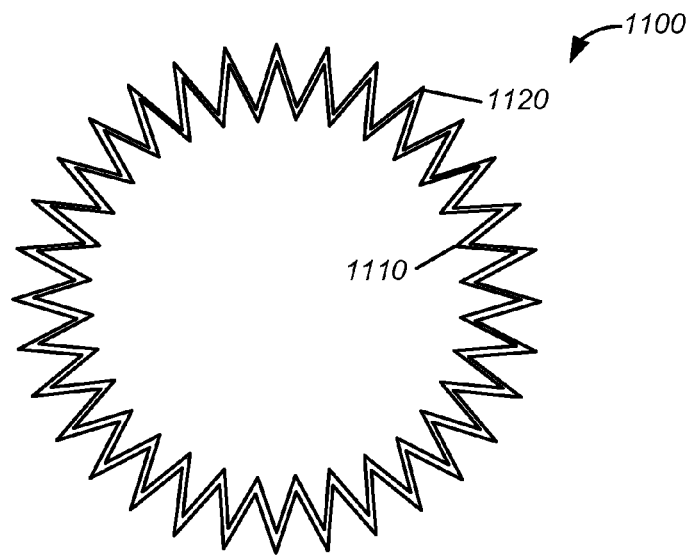
FIG. 11A shows a schematic diagram of a cross-sectional view of a containment unit having a pleated geometry.

FIG. 11A shows a schematic diagram of a cross-sectional view of a containment unit having a pleated geometry. A containment unit 1100 can include a second layer 1120 over a first layer 1110, where the second layer 1120 faces towards the outside and the first layer 1110 faces towards the inside of the containment unit 1100. The first layer 1110 can include a hydrophobic microporous membrane and the second layer 1120 can include an ionomer membrane. The first layer 1110 and the second layer 1120 form an ionomer-microporous membrane pair that can be used in water recovery processes. The first layer 1110 may be sealed to itself. The second layer 1120 may be sealed to itself and/or to the first layer 1110. In some implementations, the first layer 1110 can be adjacent to the second layer 1120 so that the first layer 1110 and the second layer 1120 essentially function as a membrane filtration unit. In some implementations, the first layer 1110 can be coupled to or sealed to the second layer 1120. The first layer 1110 can be impermeable to liquids and solids of wastewater but permeable to gases and vapors of the wastewater. The second layer 1120 can be permeable to water vapor but impermeable to one or more contaminants of the gases and vapors of the wastewater.

In some implementations, the containment unit 1100 shows a membrane pair of a PTFE membrane and a sulfonated perfluorinated ionomer membrane such as Nafion®, where the membrane pair includes the two layers 1110, 1120 co-located or adjacent to each other. For example, the second layer 1120 can enclose the first layer 1110, where a surface area ratio of the second layer 1120 to the first layer 1110 is approximately 1:1. As shown in FIG. 11A, the second layer 1120 may be pleated and the first layer 1110 may be pleated. Adding pleats to the structure of the containment unit 1100 can increase surface area and allow for greater and more continuous processing of wastewater.

Figure 11B:
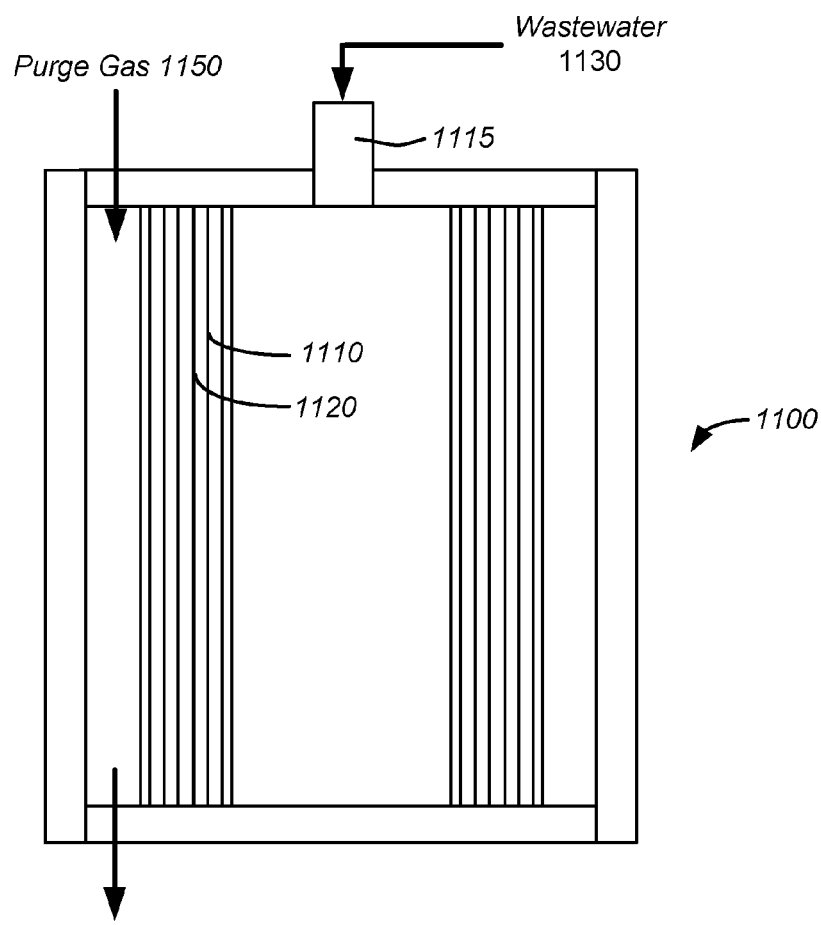
FIG. 11B shows a schematic diagram of an example water processing apparatus including the containment unit of FIG. 11A.

FIG. 11B shows a schematic diagram of an example water processing apparatus including the containment unit of FIG. 11A. Instead of a bag-like configuration, packaging of the containment unit 1100 can take on a variety of different structures, such as a filtration cartridge. In FIG. 11B, wastewater 1130 can enter the containment unit 1100 through inlet 1115 (e.g., fill port). The wastewater 1130 can be contained by the membrane pair including a first layer 1110 and a second layer 1120. The ratio of the surface area of the membrane pair to volume of the wastewater can be increased using a pleated geometry compared to a bag-like geometry. Other geometries may be possible, such as spiral-wound geometry, tube-and-shell geometry, and multi-layer stack geometry. Purge gas 1150 can sweep through the containment unit 1100 and across the surface of the second layer 1120 to collect water vapor from the wastewater. The collected water vapor can be condensed to recover purified water, while contaminants of the wastewater can remain inside.

Although the foregoing disclosed systems, methods, apparatuses, processes, and materials have been described in detail within the context of specific implementations for the purpose of promoting clarity and understanding, it will be apparent to one of ordinary skill in the art that there are many alternative ways of implementing foregoing implementations which are within the spirit and scope of this disclosure. Accordingly, the implementations described herein are to be viewed as illustrative of the disclosed inventive concepts rather than restrictively, and are not to be used as an impermissible basis for unduly limiting the scope of any claims eventually directed to the subject matter of this disclosure.

What is claimed is:

1. A water processing apparatus for treating wastewater, the apparatus comprising:
    a containment unit for holding wastewater, wherein the containment unit comprises:
        a first layer forming the interior of the containment unit, wherein the first layer comprises a hydrophobic microporous membrane; and
        a second layer over the first layer and surrounding the first layer to enclose the first layer, wherein the second layer comprises an ionomer membrane;
        wherein the first layer is sealed to itself to enclose the wastewater in the first layer, wherein the first layer has a first surface area and the second layer has a second surface area, the ratio of the first surface area to the second surface area is approximately 1:1.

2. The apparatus of claim 1, wherein the first layer is heat sealed to itself by a thermoplastic material.

3. The apparatus of claim 1, wherein the containment unit further comprises:
    a receptacle configured to receive wastewater and providing access to the interior of the containment unit.

4. The apparatus of claim 1, wherein a geometry of the first layer and the second layer of the containment unit is a tube-and-shell geometry.

5. The apparatus of claim 1, wherein the containment unit further comprises:
    a third layer over the second layer and forming the exterior of the containment unit, wherein the third layer comprises polyethylene.

6. The apparatus of claim 1, wherein the water vapor partial pressure in an ambient environment of the containment unit is less than the water vapor partial pressure in the interior of the containment unit.

7. The apparatus of claim 1, wherein the first layer is impermeable to liquids and solids of the wastewater but permeable to gases and vapors of the wastewater, and wherein the second layer is permeable to water vapor and impermeable to one or more contaminants of the gases and vapors.

8. A method for treating wastewater, the method comprising:
    flowing wastewater into a containment unit, wherein the containment unit comprises:
        a first layer forming the interior of the containment unit, wherein the first layer includes a hydrophobic microporous membrane; and
        a second layer over the first layer and surrounding the first layer to enclose the first layer, wherein the second layer includes an ionomer membrane, wherein the first layer has a first surface area and the second layer has a second surface area, a ratio of the first surface area to the second surface area being approximately 1:1;
    treating the wastewater in the containment unit by permeating gases and vapors of the wastewater through the first layer and retaining liquids and solids of the wastewater inside the first layer;
    delivering a gas stream over the second layer of the containment unit so that a water vapor partial pressure outside the containment unit is less than a water vapor partial pressure inside the containment unit; and
    collecting water vapor from the gases and vapors into the gas stream based on at least a difference between the water vapor partial pressure outside the containment unit and inside the containment unit.

9. The method of claim 8, wherein a geometry of the first layer and the second layer is a tube-and-shell geometry.

10. The method of claim 8, wherein the first layer is heat sealed to itself by a thermoplastic material.

* * * * *